(12) United States Patent
Berneth et al.

(10) Patent No.: US 6,569,361 B1
(45) Date of Patent: May 27, 2003

(54) ELECTROCHROME POLYMER SYSTEMS

(75) Inventors: Horst Berneth, Leverkusen (DE); Uwe Claussen, Leverkusen (DE); Helmut Werner Heuer, Krefeld (DE); Serguei Kostromine, Swisttal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/462,045

(22) PCT Filed: Jun. 24, 1998

(86) PCT No.: PCT/EP98/03862

§ 371 (c)(1),
(2), (4) Date: Feb. 1, 2000

(87) PCT Pub. No.: WO99/02621

PCT Pub. Date: Jan. 21, 1999

(30) Foreign Application Priority Data

Jul. 7, 1997 (DE) .......................... 197 28 876
Jan. 17, 1998 (DE) .......................... 198 01 638

(51) Int. Cl.[7] ............... G02F 1/00; G02F 1/153
(52) U.S. Cl. ............... 252/583; 359/265; 359/267; 359/272; 359/275
(58) Field of Search ............... 252/583; 359/265, 359/267, 272, 275

(56) References Cited

U.S. PATENT DOCUMENTS

| | | | |
|---|---|---|---|
| 4,902,108 A | 2/1990 | Byker | 350/357 |
| 5,140,455 A | 8/1992 | Varaprasad et al. | 359/275 |
| 5,818,636 A * | 10/1998 | Leventis et al. | 359/275 |
| 6,154,306 A * | 11/2000 | Varaprasad et al. | 359/265 |
| 6,203,154 B1 * | 3/2001 | Kobayashi et al. | 359/265 |

FOREIGN PATENT DOCUMENTS

| | | | |
|---|---|---|---|
| DE | 4325591 | | 2/1995 |
| EP | 196497 | * | 10/1986 |
| EP | 319 156 | * | 6/1989 |
| EP | 612 826 | * | 8/1994 |
| WO | 94/23333 | * | 10/1994 |

OTHER PUBLICATIONS

Derwent Abstract of JP 59–217791, (1994).*
Lawrence et al., Journal of Physical Chemistry, vol. 90, No. 12, pp. 2696–2702, (1986).*
Ashton et al., Journal of the American Chemical Society, vol. 118, No. 21, pp. 4931–4951, (1996).*
Electrochrom ISM, VCH Weinheim, (month unavailable) 1995, pp. 59–92, Monk et al, Inorganic Systems, Metal Oxides.
Topics in Current Chemistry, vol. 3, Hünig et al, Two Step Reversible Redox Systems of Weitz Type, pp. 1–44, (1980).
Elecktrokhimiya (translated from vol. 13, No. 1, pp. 32–37, Jan. 1977) pp. 24–28 I.V. Shelepin et al, Electrochromism of Organic Compounds I. Electrochemical and Spectral Properties of A System Based on Methylviologen and 3–Ethyl–2–Benzothiazolone Azine.
Elektrokhimiya, Apr. 1997, pp. 404–408,Abramzon et al, Moisture–Exchange Processes in Hydrogenoxygen Cells with Capillary Membrane III. Nonstationary Processes During Load Connection.
Elektrokhimiya, Feb. 1978, pp. 271–274, Ushakov et al, Electrochromism of Organic Compounds some Properties of Two–Electrode Cells.
Angew. Chemie, 90, Jan. 1978, Deuchert et al, Mehrstufige organische Redoxsysteme ein Allgemeines Struturprinzip (Translation also attached) pp. 927–937.

* cited by examiner

*Primary Examiner*—Philip Tucker
(74) *Attorney, Agent, or Firm*—Godfried R. Akorli; Diderico van Eyl; Richard E.L. Henderson

(57) ABSTRACT

Electrochromic systems containing soluble electrochromic polymers which are accessible by polymerization, polycondensation or polyaddition from electrochromic monomers are used in devices for variable transparency to electromagnetic radiation.

6 Claims, 2 Drawing Sheets

ELECTROCHROME POLYMER SYSTEMS

The present invention relates to electrochromic systems, to electrochiomic monomers and polymers to processes for their preparation, and to the use of the electrochromic systems in devices for variable transparency to electromagnetic radiation.

There are redox-active materials which have different colours in their different oxidation states. This phenomenon is referred to as electrochromicity, and the substances concerned have electrochromic properties. This property can be utilized for modulation of electromagnetic radiation if at least one oxidation state is colourless and at least one other is coloured. Devices in which these properties are utilized are, for example, displays, self-darkening rear-view mirrors in vehicles or dividing screens of variable transparency. They are in principle electrochemical cells.

There are currently 3 different ways of achieving devices of this type:

a) In the solution type, a soluble dye is generated in the electrolyte by an electrochemical redox reaction. The dye molecules formed at one electrode migrate in the field to the counterelectrode, where they are discharged. A medium of this type will always be of low viscosity in order to avoid impairing material transport.

b) If the redox components are selected in such a way that they are in solution in one form, but are insoluble in the other, a precipitate is produced electrochemically at one electrode and re-dissolves on reversal of the current direction.

c) Finally, an electrode coating can be provided at the outset, and this solid layer can be coloured reversibly by the electrochemical reaction.

Method a) is widespread in industry today in a particular variant. In this, a system which consists of the substances $RED_1$ and $OX_2$ dissolved in a solvent is electrolyzed. The substance pair should be colourless in the currentless state of the cell. When a current flows, the substance pair is converted into the $OX_1/RED_2$ form, which is as intensely coloured as possible. The two substances are thus selected so that both the oxidation and reduction reactions have complementary colours to one another or are colourless. Thus, one species always becomes the counterelectrode for the other, so that the life of the free-radical ions is very short. When the current is switched off, the cell thus rapidly becomes pale again. A substance pair which is suitable for this process with a complementary counterelectrode has been described by Shelepin et al. (Elektrokhimiya 13, 32–37 (1977); 13, 404–408 (1977); 14, 319–322 (1978)), the industrial use thereof for the modulation of electromagnetic radiation in automobile rear-view mirrors being disclosed in the patent specifications U.S. Pat. No. 4,902,108 (Gentex) and U.S. Pat. No. 5,140,455 (Donnelly).

Method b) uses the high association tendency of free-radical ions of viologens, but these contain absolutely no groups by means of which they can be anchored to surfaces. Only their low solubility allows them to be deposited on the electrodes. These coatings nevertheless have very low cycle stability.

Method c) is less used in industry than widely described. A particular difficulty here has proven to be the achievement of adequate cycle stability. The term "cycle stability" is taken to mean the frequency with which the sequence of colourless/coloured switching of the cell can be carried out without a change in the absorption spectra or the time behaviour taking place. Even in this case, however, considerable improvements have been achieved through a combination of different substance pairs (WO-A 94/23333, Igen Inc.).

Devices which operate on the principle of soluble dyes are widely used as rear-view mirrors for automobiles (method a). For technical reasons, it is of importance here that the solutions have the lowest possible viscosity, but safety considerations mean that they should have the highest possible viscosity since, in the event of breaking of glass, both the splinters and the cell filling should be held firmly. This requirement is taken into account through the thickening of the solutions by addition of a suitable polymer which increases the viscosity of the solutions, as described, for example, in U.S. Pat. No. 4,902,108. The high viscosity is furthermore desired since the cells, which are generally operated in such a way that the mirror surface is parallel to the earth's gravity field, tend toward "colour separation" owing to convection. This favours, in particular in the case of large dimensions (truck mirrors), the formation of convections, which can result in separation of the cathodic and anodic products.

However, a considerable problem occurs here in practice, since the viscous solutions can only be introduced into the cells with great difficulty. This is undesired merely from the time expenditure point of view and always means a compromise between fillability and the highest possible viscosity that is desired in the cell. It has therefore repeatedly been proposed, for example in EP-A 0 612 826 (Donnelly) and WO-A 96/03475 (Gentex), to fill the cells with monomers and to carry out the polymerization only when the monomers are in the cell.

The present invention relates to systems which can be operated as desired by principle a) or c) and which are characterized in that at least one of the substituents $RED_1$ and $OX_2$ is a constituent of a soluble, electrochromic polymer.

Polymers which contain $OX_2$ are known as a polymeric viologens (P. M. S. Monk, R. J. Mortimer, D. R. Rosseinsky, "Electrochromism", VCH, 1995)

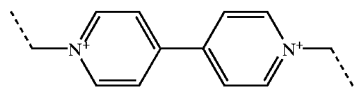

Polymers based on acylated 5,10-dihydrophenazines ($RED_1$) have been described in DE-A 4 325 591.

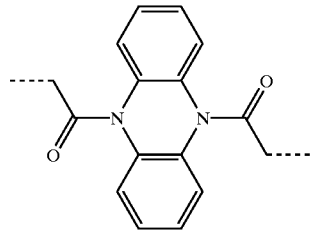

However, these substances have low solubility and cannot be used for the proposed application. Surprisingly, the polymers according to the invention are readily soluble in organic solvents and do not precipitate even when the charge state is changed.

The present invention relates to an electrochromic system comprising at least one reversibly electrochemically oxidizable substituent $RED_1$ which is converted into $OX_1$ by electron release at an anode, and at least one reversibly electrochemically reducible substituent $OX_2$ which is converted into $RED_2$ by electron take-up at a cathode, where an increase in the absorbance in the visible region of the spectrum from a colourless or weakly coloured form into a coloured form with at least one electron release or electron take-up, in each case the colourless or weakly coloured form is reformed after charge equalization, characterized in that at least one of the substituents $RED_1$ or $OX_2$ is covalently bonded in a soluble polymer.

The present invention preferably relates to an electrochromic system comprising at least one reversibly electrochemically oxidizable substituent $RED_1$ which is converted from a colourless or weakly coloured form into a coloured form $OX_1$ by electron release at an anode, with an increase in the absorbance in the visible region of the spectrum, and at least one reversibly electrochemically reducible substituent $OX_2$ which is converted from a colourless or weakly coloured form into a coloured form $RED_2$ by electron take-up at a cathode, with an increase in the absorbance in the visible region of the spectrum, where in each case the colourless or weakly coloured form is re-formed after charge equalization, characterized in that at least one of the substituents $RED_1$ or $OX_2$ is covalently bonded in a soluble polymer.

Figure 1:
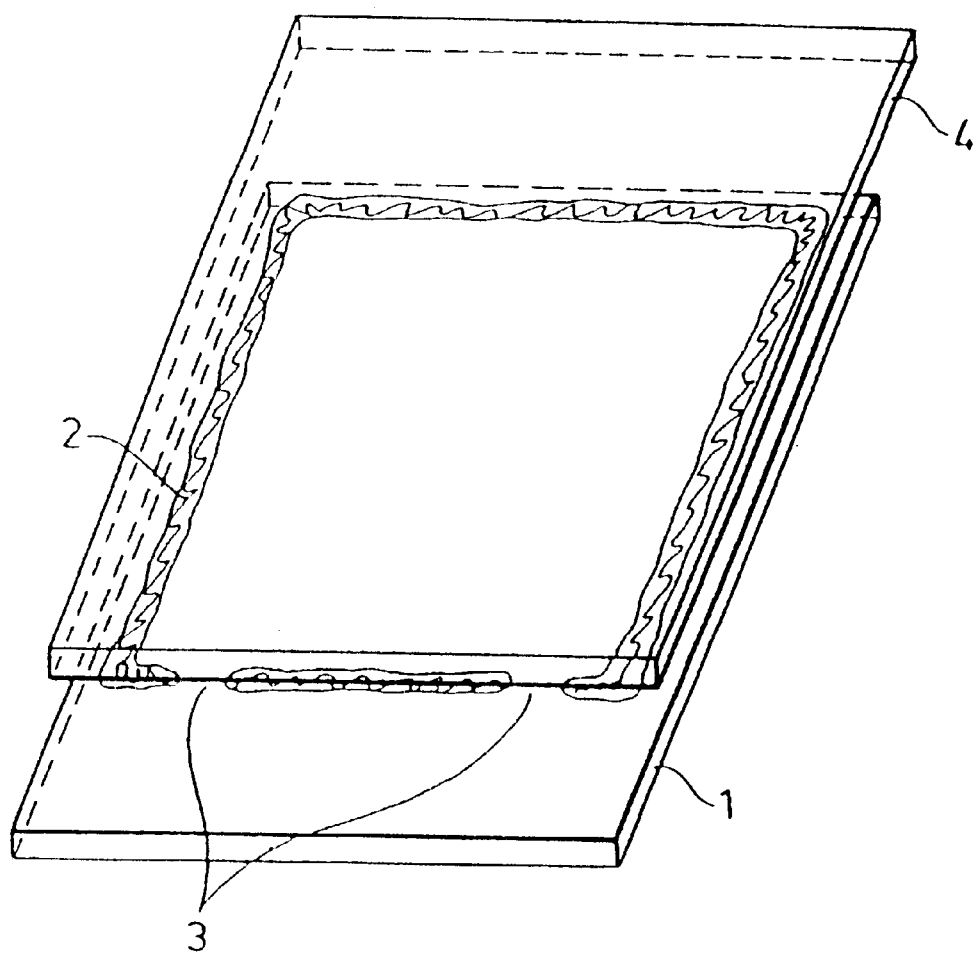
FIG. 1 is an etched glass plate used to make an electrochromic device in accordance with the invention.

The soluble polymer preferably conforms to the formula I

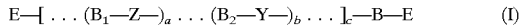

in which the units $—B_1—Z—$ and $—B_2—Y—$ are linked to one another alternately, randomly or in blocks, Y and Z, independently of one another, are a substituent $RED_1$ or $OX_2$, where $OX_2$ is a reversibly electrochemically reducible substituent which is converted into $RED_2$ by electron take-up at a cathode, where an increase in the absorbance in the visible region of the spectrum from a colourless or weakly coloured form into a coloured form is associated with the electron take-up, and where the colourless or weakly coloured form is re-formed after charge equalization, $RED_1$ is a reversibly electrochemically oxidizable substituent which is converted into $OX_1$ by electron release at an anode, where an increase in the absorbance in the visible region of the spectrum from a colourless or weakly coloured form into a coloured form is associated with the electron release, and where the colourless or weakly coloured form is re-formed after charge equalization, and B is $B_1$ or $B_2$, $B_1$ and $B_2$ are identical or different bridging units, E is an end group of the polymer chain, a and b are the molar fractions of the monomer units $—B_1—Z—$ and $—B_2—Y—$, which have any desired values between 0 and 1, where $a=1-b$, c is a number-average degree of polymerization $c_n$ and is from 3 to 200,000, where the ratio between $c_n$ and the weight-average degree of polymerization $c_w$ (polymolarity index) $Q=c_w/c_n$ is between 1.1 and 100, preferably between 1.2 and 20.

The invention also relates to the soluble polymer of the formula I having the above-mentioned definition of the variables.

In a preferred embodiment of the electrochromic system and of the soluble polymers, only one of the substituents $RED_1$ or $OX_2$ is covalently bonded in a polymer chain in accordance with the general formulae (II) and (III):

and the other component is present in monomolecular or low-oligomeric form, where the variables are as defined above.

Preference is furthermore given to an electrochromic system and a soluble polymer in which both substituents $RED_1$ and $OX_2$ are covalently bonded in blocks in a polymer chain and conform to the general formula (IV)

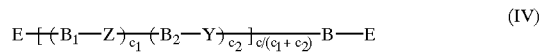

where the variables are as defined above, and $c_1$ and $c_2$ are an average degree of polymerization, where $(c_1+c_2) \leq c$.

In a further preferred embodiment of the electrochromic system and of the soluble polymer, both substituents $RED_1$ and $OX_2$ are covalently bonded in a polymer chain consisting of two covalently bonded blocks. The soluble polymer here has the general formula (V)

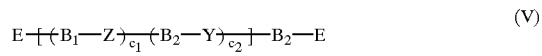

where the variables are as defined above, and $c_1+c_2=c$.

Preference is furthermore given to an electrochromic system and a soluble polymer in which both substituents $RED_1$ and $OX_2$ are covalently bonded alternately in a polymer chain and conform to the general formula (VI)

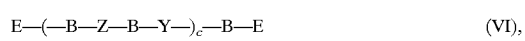

where the variables are as defined above.

Finally, preference is given to an electrochromic system and a soluble polymer in which both substituents $RED_1$ and $OX_2$ are bonded in a polymer chain where the blocks of substituents are bridged by individual units of other substituents, i.e. the electrochromic polymers conform to the general formulae VII and VIII

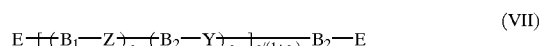

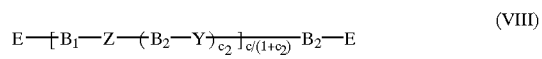

where the variables are as defined above.

In the formulae (I) to (VIII), $B_1$ and $B_2$, independently of one another, are O, $—CH_2—$, $—(CH_2)_n—$ or $[Y^1{}_s—(CH_2)_m—Y^2—(CH_2)_e—Y^3]_o—(CH_2)_p—Y^4{}_q—$, where $Y^1$ to $Y^4$, independently of one another, are O, S, $NR^{19}$, COO, OCO, CONH, OCONH, NHCONH, C(=O), OC(=O)O, $—CH=CH—$ (trans- or cis), $—CH_2—$ CH=CH—, —C≡C—, —CH$_2$—C≡C—, (C$_4$–C$_7$)-cycloalkanediyl, (C$_6$–C$_{12}$)-arylene or (C$_7$–C$_{14}$)-arylalkylene, in particular p- and m-dimethylenephenylene or a heterocyclic radical of the structure

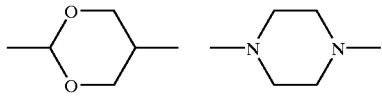

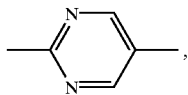

n is an integer from 1 to 16, m and p, independently of one another, are an integer from 0 to 12, o is an integer from 0 to 6, and q and s, independently of one another, are 0 or 1.

In the formulae I–VIII, OX$_2$ is preferably a radical of the formulae

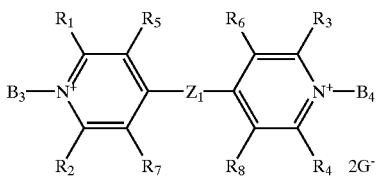
(IX)

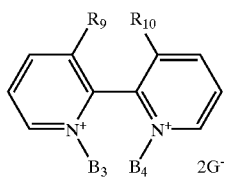
(X)

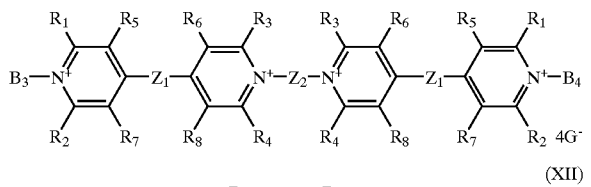
(XI)

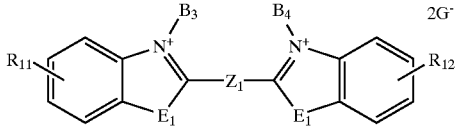
(XII)

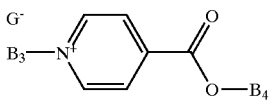
(XIII)

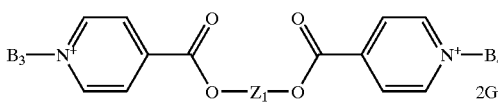
(XIV)

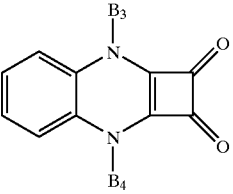
(XV)

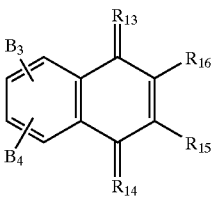
(XVI)

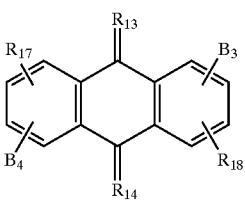
(XVII)

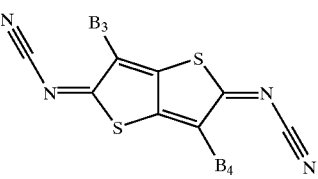
(XVIII)

in which $R_1$ to $R_4$, independently of one another, are hydrogen, (C$_1$–C$_8$)-alkyl, (C$_2$–C$_{12}$)-alkenyl, (C$_3$–C$_7$)-cycloalkyl, (C$_7$–C$_{15}$)-aralkyl or (C$_6$–C$_{10}$)-aryl, $R_5$ and $R_6$ or $R_7$ and $R_8$ are hydrogen or together are a —(CH$_2$)$_2$— or —(CH$_2$)$_3$— bridge, $R_9$ and $R_{10}$, independently of one another, are hydrogen or in pairs are a —(CH$_2$)$_2$—, —(CH$_2$)$_3$— or —CH=CH— bridge, $R_{11}$, $R_{12}$, $R_{17}$ and $R_{18}$, independently of one another, are hydrogen, (C$_1$–C$_4$)-alkyl, (C$_1$–C$_4$)-alkoxy, halogen, cyano, nitro or (C$_1$–C$_4$)-alkoxycarbonyl, $R_{13}$ and $R_{14}$, independently of one another, are O, N—CN, C(CN)$_2$ or N-(C$_6$–C$_{10}$)-aryl-, $R_{15}$ and $R_{16}$ are a —CH=CH—CH=CH— bridge, $E_1$ is an O or S atom, $Z_1$ is a direct bond, —CH=CH—, —C(CH$_3$)=CH—, —C(CN)=CH—, —CCl=CCl—, —C(OH)=CH—, —CCl=CH—, —CH=CH—, —CH=N—N=CH—, —C(CH$_3$)=N—N=C(CH$_3$)— or —CCl=N—N=CCl—, $Z_2$ is —(CH$_2$)$_r$—, p- or m-CH$_2$—C$_6$H$_4$—CH$_2$—, r is an integer from 1 to 10, and G$^-$ is a colourless anion which is redox-inert under the reaction conditions.

In the formulae (I) to (VIII), the group $RED_1$ is preferably a radical of the formulae

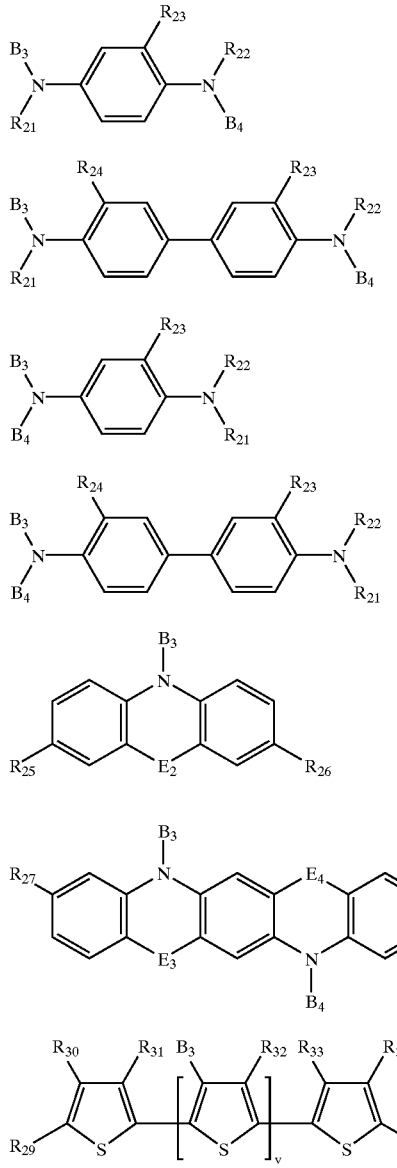

(XIX)
(XX)
(XXI)
(XXII)
(XXIII)
(XXIV)
(XXV)

in which $R_{21}$ and $R_{22}$ are $(C_1-C_8)$-alkyl, $(C_2-C_{12})$-alkenyl, $(C_3-C_7)$-cycloalkyl, $(C_7-C_{15})$-aralkyl or $(C_6-C_{10})$-aryl, $R_{23}$ to $R_{28}$, independently of one another, are hydrogen, $(C_1-C_4)$-alkyl, $(C_1-C_4)$-alkoxy, halogen, cyano, nitro, $(C_1-C_4)$-alkoxycarbonyl or $(C_6-C_{10})$-aryl, and $R_{26}$ is additionally $NR^{37}R^{37}$;

$R_{29}$ to $R_{35}$, independently of one another, are hydrogen, $(C_1-C_4)$-alkyl, $(C_1-C_4)$-alkoxy, cyano, $(C_1-C_4)$-alkoxycarbonyl or $(C_6-C_{10})$-aryl, or $R_{29}$ and $R_{30}$, and $R_{34}$ and $R_{35}$, independently of one another, together are a $-(CH_2)_3-$, $-(CH_2)_4-$ or $-CH=CH-CH=CH-$ bridge, $E_2$ is an O or S atom or the groups $N-B_4$, $C(CH_3)_2$, C=O or $SO_2$, $E_3$ and $E_4$ is an O or S atom or the group $NR^{36}$, $R^{36}$ and $R^{37}$, independently of one another, are $(C_1-C_{12})$-alkyl, $(C_2-C_8)$-alkenyl, $(C_3-C_7)$-cycloalkyl, $(C_7-C_{15})$-aralkyl or $(C_6-C_{10})$-aryl, and $R^{36}$ is additionally hydrogen, or $R^{37}$ in the meaning of $NR^{37}R^{37}$ together with the N atom to which they are bonded, form a five-or six-membered, saturated ring, which may contain further heteroatoms, $R_{36}$ is $(C_1-C_{12})$-alkyl, $(C_2-C_8)$-alkenyl, $(C_3-C_7)$-cycloalkyl, $(C_7-C_{15})$-aralkyl or $(C_6-C_{10})$-aryl, and v is an integer from 1 to 20, if $B_3$ is identical to $B_4$, $B_3$ and $B_4$ are identical to $B_1$ or $B_2$, if $B_3$ is not identical to $B_4$ or $B_4$ is absent, $B_3$ is $[Y^1{}_s-(CH_2)_m-Y^2-(CH_2)_c-Y^3]_o-Y^4$, where $Y^1$ is O, $NR^{19}$, COO, OCO, CONH, OCONH, NHCONH, C(=O), OC(=O)O, $-CH_2-CH=CH-$ (trans- or cis-), $-CH_2-C\equiv C-$, $(C_4-C_7)$-cycloalkanediyl, $(C_6-C_{12})$-arylene or $(C_7-C_{14})$-arylalkylene, $Y^2$ is O, $NR^{19}$, COO, OCO, CONH, $-CH=CH-$ (trans- or cis-), $-C\equiv C-$, $(C_4-C_7)$-cycloalkanediyl or $(C_6-C_{12})$-arylene, $Y^3$ is O, $NR^{19}$, COO, OCO, CONH or $(C_6-C_{12})$-arylene, and $Y^4$ is

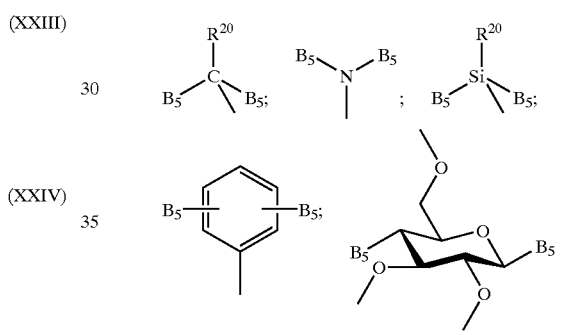

where $B_5$ is $B_1$ or $B_2$, and $R_{20}$ is hydrogen, $(C_1-C_{18})$-alkyl, $(C_1-C_4)$-alkoxy, $(C_1-C_4)$-alkoxycarbonyl, $(C_6-C_{10})$-aryl, halogen or cyano, $B_4$ is absent or is hydrogen, $(C_1-C_{18})$-alkyl, $(C_2-C_{12})$-alkenyl, $(C_1-C_4)$-alkoxy, $(C_1-C_7)$-cycloalkyl, $(C_1-C_4)$-alkoxycarbonyl, $(C_7-C_{15})$-aralkyl, $(C_6-C_{10})$-aryl, halogen, cyano or nitro, and $B_1$ and $B_2$ are as defined in the formulae I to VIII.

E in the formulae I–VIII is the end group of the polymer chain. These groups are determined by the polymer preparation process and can be, independently of one another, hydrogen, $-CR_3{}^{36}$, $=CR_2{}^{36}$, $(C_3-C_7)$-cycloalkyl, phenyl, $(C_1-C_{18})$-alkoxy or arolkoxy, benzoyloxy, $-OH$, halogen, $-COOH$, $(C_1-C_4)$-alkoxycarbonyl, $-N=C=O$, $-N-C(=O)O-$, $(C_1-C_4)$-alkyl, 2- or 4-pyridyl or $-NR_3{}^{36}$.

In the above-mentioned substituent definitions, alkyl radicals, including modified ones, for example alkoxy or aralkyl radicals, are preferably those having from 1 to 12 carbon atoms, in particular having from 1 to 8 carbon atoms, unless otherwise stated. They can be straight-chain or branched and may, if desired, carry further substituents, for example $(C_1-C_4)$-alkoxy, fluorine, chlorine, hydroxyl, cyano, $(C_1-C_4)$-alkoxycarbonyl or COOH.

The term "cycloalkyl radicals" is preferably taken to mean those having from 3 to 7 carbon atoms, in particular having 5 or 6 carbon atoms.

Alkenyl radicals are preferably those having from 2 to 8 carbon atoms, in particular from 2 to 4 carbon atoms.

Aryl radicals, including those in aralkyl radicals, are preferably phenyl or naphthyl radicals, in particular phenyl radicals. They may be substituted by from 1 to 3 of the following radicals: $(C_1-C_6)$-alkyl, $(C_1-C_6)$-alkoxy, fluorine, chlorine, bromine, cyano, hydroxyl, $(C_1-C_6)$-alkoxycarbonyl or nitro. Two adjacent radicals can also form a ring.

The invention also relates to a process for the preparation of the soluble polymers of the formula I in which one or more $RED_1$- and/or $OX_2$-containing monomers of the formulae XXVI–XXVIII

  (XXVI),

  (XXVII),

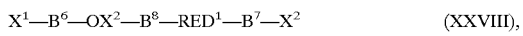  (XXVIII), in which $OX^2$ is the radical of a reversibly electrochemically reducible redox system, and $RED^1$ is the radical of a reversibly electrochemically oxidizable redox system, $B^6$, $B^7$ and $B^8$ are the bridging units, $X^1$ and $X^2$ are each a group which is capable of polymerization, polycondensation or polyaddition, are subjected to a polymerization, polycondensation or polyaddition reaction.

The preparation of the polymers of the formulae (I) to (VIII) is a polymerization, polycondensation, polyaddition or polymer-analogous reaction of the $RED_1$- and/or $OX_2$-containing monomers. It is also possible for at least one electrochromic component ($RED_1$ and/or $OX_2$) to be formed directly during formation of the polymer chain.

The preferred process is chain polymerization, particularly preferably free-radical polymerization, of the $RED_1$- and/or $OX_2$-containing monomers, which have at least one polymerizable C=C double bond. The polymerization of the monomers proceeds in suitable solvents, for example aromatic hydrocarbons, such as toluene or xylene, aromatic halogenated hydrocarbons, such as chlorobenzene, ethers, such as tetrahydrofuran and dioxane, ketones, such as acetone and cyclohexanone, alcohols, such as methanol and ethanol, and/or dimethylformamide, N-methyl-2-pyrrolidone or 1,2-propylene carbonate, in the presence of polymerization initiators, in particular polymerization initiators which supply free radicals, for example azobisisobutyronitrile or benzyl peroxide, at elevated temperatures, generally at from 30 to 130° C., preferably at from 40 to 70° C., if possible with exclusion of water and air. Isolation can be effected by precipitation using suitable agents, for example water, methanol, cyclohexane or dioxane. The products can be purified by reprecipitation.

A likewise preferred process is polycondensation to give polyamides, polyimides, polyamines, polyesters, polyethers or polycarbonates from the $RED_1$- and/or $OX_2$-containing monomers which have at least two corresponding reactive groups in their structure, such as halogen, —OH, —O$^-$, —COOH, —COO—$(C_1-C_4)$-alkyl, —O—C(=O)-$(C_1-C_4)$-alkyl, —COO$^-$, —NH$_2$— or —NH—$(C_1-C_4)$-alkyl.

Particular preference is given to polyester preparation from the above-mentioned electrochromic monomers which have two OH groups. The reaction between these monomers and any desired dicarboxylic acid dichlorides, for example adipoyl dichloride, proceeds in solution with removal of the hydrogen chloride with the corresponding binder, for example triethylamine or pyridine, in the temperature range between 20° and 120° C., preferably at from 30 to 70° C. The solvents used are generally aromatic hydrocarbons, such as toluene or xylene, ethers, such dioxane, halogenated hydrocarbons, such as chloroform and 1,2-dichloroethane, and/or dimethylformamide, N-methyl-2-pyrrolidone, or 1,2-propylene carbonate. Isolation can be effected by precipitation using suitable agents, for example water, methanol, cyclohexane or dioxane.

Another particularly preferred process is polyester and polyether preparation from electrochromic monomers which have two primary halogen groups. The reaction between these monomers and any desired dicarboxylic acid metal salts, for example sodium adipate, or any desired metal salts of the bisphenols, for example 4,4'-isopropylidenediphenol dipotassium salt, proceeds in aprotic anhydrous solvents, such as dimethylformamide, dimethyl sulphoxide, N-methyl-2-pyrrolidone, hexamethylphosphoric triamide, 1,3-dimethyltetrahydro-2(11)-pyrimidinone, at elevated temperature, generally at from 30 to 130° C., preferably at from 40 to 80° C., and with exclusion of air and water. Isolation can be effected by precipitation using suitable agents, for example water, methanol or dioxane.

A further preferred process is polyaddition to give polyurethanes, polyureas or polyammonium compounds from the $RED_1$- and/or $OX_2$-containing monomers which also have at least two corresponding reactive groups in the structure, such as halogen, —OH, —N=C=O or —NH$_2$, or a tertiary nitrogen atom which carries three identical or different $(C_1-C_{12})$-alkyl, $(C_7-C_{15})$-aralkyl or $(C_6-C_{10})$-aryl substituents or is a member of a 4- to 7-atom ring, which may also contain further heteroatoms.

A particularly preferred process is polyurethane preparation from electrochromic monomers which have two primary or secondary OH groups. The reaction between these monomers and any desired aliphatic or aromatic diisocyanates, for example hexamethylene diisocyanate or 4,4'-methylenebis(phenyl isocyanate), proceeds without additional solvent or in suitable solvents, for example aromatic hydro-carbons, such as toluene or xylene, ethers, such as tetrahydrofuran and dioxane, ketones, such as acetone and cyclolhexanone, and/or dimethylformamide, N-methyl-2-pyrrolidone or 1,2-propylene carbonate, without a catalyst or in the presence of a catalyst, for example tin(II) octanoate (®Desmorapid 10) or dibutyltin dilaurate (®Desmorapid 7), at elevated temperatures, generally at from 30 to 150° C., preferably at from 60 to 130° C. with exclusion of water and air.

Another particularly preferred process is the preparation of polyammonium compounds from electrochromic monomers which have two primary halogen groups. The reaction between these monomers and any desired aliphatic or aromatic compounds which have two tertiary nitrogen atoms which carry three identical or different $(C_1-C_{12})$-alkyl, $(C_7-C_{15})$-aralkyl or $(C_6-C_{10})$-aryl substituents or are members of 4- to 7-atom rings, which may also contain further heteroatoms, for example N,N,N',N'-tetramethylethylenediamine or 4,4'-bipyridyl, proceeds in suitable solvents, such as, for example, acetone, cyclohexanone, dimethylformamide, N-methyl-2-pyrrolidone, acetonitrile, propionitrile, 3-methoxypropionitrile, hydroxy-propionitrile, glutaronitrile, nitromethane, 1,2-ethanediol or diethylene glycol, at elevated temperatures, generally at from 50 to 190° C., preferably at from 70 to 150° C., with exclusion of water and air.

A further preferred process is the polymer-analogous reaction of polymers carrying functional groups, such as —OH, halogen, —COOH, —COCl, —C(=O)—O—C(=O)—, —N=C=O, —NH$_2$, a secondary or tertiary nitrogen atom which carries identical or different (C$_1$–C$_{12}$)-alkyl, (C$_7$–C$_{15}$)-aralkyl or (C$_6$–C$_{10}$)-aryl substituents or is a member of a 4- to 7-atom ring, which may also contain further hereroatoms, with the RED$^1$- and/or OX$^2$-containing monomers, which then carry at least one corresponding reactive group in their structure, such as halogen, —OH, —COOH, —COCl, —N=C=O, —NH$_2$, a secondary or tertiary nitrogen atom which carries identical or different (C$_1$–C$_{12}$)-alkyl, (C$_7$–C$_{15}$)-aralkyl or (C$_6$–C$_{10}$)-aryl substituents or is a member of a 4- to 7-atom ring, which may also contain further heteroatoms.

A particularly preferred process is the polymer-analogous reaction of polymers carrying —N=C=O groups with monomers carrying —OH groups. This reaction proceeds without additional solvent or in suitable solvents, for example in aromatic hydrocarbons, such as toluene or xylene, ethers, such as tetrahydrofuran or dioxane, ketones, such as acetone or cyclohexanone, and/or dimethylformamide, N-methyl-2-pyrrolidone or 1,2-propylene carbonate, without a catalyst or in the presence of a catalyst, for example tin(II) octanoate (®Desmorapid 10) or dibutyltin dilaurate (®Desmorapid 7), at elevated temperatures, generally at from 30 to 150° C., preferably at from 60 to 130° C., with exclusion of water and air.

Another particularly preferred process is the polymer-analogous reaction of polymers carrying —COCl groups with monomers carrying —OH groups. This reaction proceeds in solution with removal of the hydrogen chloride with a corresponding binder, for example a triethylamine or pyridine, in the temperature range between 20° and 120° C., preferably at from 30 to 70° C. The solvents used are generally aromatic hydrocarbons, such as toluene or xylene, ethers, such dioxane, halogenated hydrocarbons, such as chloroform and 1,2-dichloroethane, and/or dimethylformamide, N-methyl-2-pyrrolidone, or 1,2-propylene carbonate. Isolation can be effected by precipitation using suitable agents, for example water, methanol, cyclohexane or dioxane.

Another particularly preferred process is the polymer-analogous reaction of polymers carrying —NH$_2$, a secondary or tertiary nitrogen atom which carries identical or different (C$_1$–C$_{12}$)-alkyl, (C$_7$–C$_{15}$)-aralkyl or (C$_6$–C$_{10}$)-aryl substituents or is a member of a 4- to 7-atom ring, which may also contain further heteroatoms, with monomers carrying halogen atoms. This reaction proceeds in suitable solvents, such as, for example, acetone, cyclohexanone, dimethylformamide, N-methyl-2-pyrrolidone, acetonitrile, propionitrile, 3-methoxypropionitrile, hydroxypropionitrile, glutaronitrile, nitromethane, 1,2-ethanediol or diethylene glycol, at elevated temperatures, generally at from 50 to 190° C., preferably at from 70 to 150° C., with exclusion of water and air.

In the preparation of the polymers of the formulae (I) to (VIII), it is also possible to use a combination of the above-mentioned processes, for example the synthesis of the polyester prepolymer carrying OH end groups, with subsequent chain extension using diisocyanates.

The term "monomers" is taken to mean substances which can be converted into a soluble polymer by the above-mentioned polymerization processes and conform to the formulae XXVI–XXVIII:

  (XXVI),

  (XXVII),

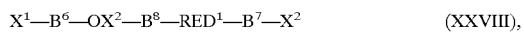  (XXVIII), in which

OX$^2$ is a reversibly electrochemically reducible substituent, and

RED$^1$ is a reversibly electrochemically oxidizable substituent, and

B$^6$, B$_7$ and B$^8$ are the bridging units, and

X$^1$ and X$^2$ are each a group which is capable of polymerization, polycondensation or polyaddition.

Preference is given to monomers which conform to the formulae XXVI–XXVIII in which OX$^2$ is a radical of the formulae IX–XVIII, and RED$^1$ is a radical of the formulae XIX–XXV, where B$^3$ and B$^4$ are replaced by the bridging units B$^6$, B$^7$ and B$^8$, X$^1$ and X$^2$ are halogen, —OH, —O$^-$, —COOH, —COO—(C$_1$–C$_4$)-alkyl, —O—C(=O)-(C$_1$–C$_4$)-alkyl, —COO$^-$, —NH$_2$, —NH—(C$_1$–C$_4$)-alkyl, —N=C=O, or the tertiary nitrogen atom which carries three identical or different (C$_1$–C$_{12}$)-alkyl, (C$_7$–C$_{15}$)-aralkyl or (C$_6$–C$_{10}$)-aryl substituents or is a member of the 4- to 7-atom ring, which may also contain further heteroatoms, or X$^1$ or X$^2$ is a C=C— double bond, an —O—C(=O)—CH=CH$_2$ group or an —O—C(=O)—C(CH$_3$)=CH$_2$— group.

Particular preference is given to monomers which conform to the formula XXIX

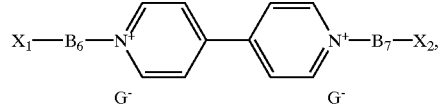

XXIX in which

B$^6$=B$^7$=—(CH$_2$)$_n$—,

X$^1$=X$^2$=—OH, n=2–11,

G$^-$ is halide, tetrafluoroborate, tetraphenylborate, cyanotriphenylborate, perchlorate, dodecylsulphonate, hexadecylsulphonate, toluenesulphonate, butylbenzenesulphonate, dodecylbenzenesulphonate, hexafluorophosphate, 7,8- or 7,9-dicarba-nido-undecaborate (1–).

These monomers are prepared by direct quaternization of 4,4'-bipyridine using an ω-halo-1-alkanol, preferably using an ω-bromo-1-alkanol, in an aprotic solvent, preferably N,N-dimethylformamide, N,N-dimethylacetamide or N-methyl-2-pyrrolidone, at elevated temperatures, generally at from 120 to 200° C., preferably at from 150 to 180° C., with subsequent ion exchange, which is effected by precipitation in alcohol or by extraction from water using an organic solvent, such as toluene or methylene chloride.

Particular preference is also given to monomers which conform to the formula XXIX in which
  $B^6=B^7$=o-, m- or p-CH$_2$—C$_6$H$_4$—CH$_2$—,
  $X^1=X^2$=halogen, preferably —Cl,
  G$^-$ is halide, tetrafluoroborate, tetraphenylborate, cyanotriphenylborate, perchlorate, hexafluorophosphate, 7,8- or 7,9-dicarba-nido-undecaborate (1–).

These monomers are prepared by direct quaternization of 4,4'-bipyridine using the excess α,α'-halo-o-, -m- or -p-xylene, preferably using α,α'-chloro-m- or -p-xylene, in an aprotic solvent, preferably acetonitrile, N,N-dimethylformamide, N,N-dimethylacetamide or N-methyl-2-pyrrolidone, particularly preferably acetonitrile, at elevated temperatures, generally at from 40 to 150° C., preferably at from 70 to 100° C., with subsequent ion exchange, which is effected by precipitation in alcohol, preferably in methanol, ethanol or propanol.

Particular preference is also given to monomers which conform to the formula XXIX
in which
  $B^6$=—(CH$_2$)$_n$—, where n=2–11,
  $B^7$=-(C$_6$–C$_{10}$)-aryl, substituted -(C$_6$–C$_{10}$)-aryl, (C$_1$–C$_{18}$)-alkyl, (C$_1$–C$_{18}$)-alkenyl or (C$_7$–C$_{24}$)-aralkyl,
  $X^1$=—OH,
  $X^2$ is absent, and
  G$^-$ is selected from the group consisting of halide, tetrafluoroborate, tetraphenylborate, cyanotriphenylborate, perchlorate, dodecylsulphonate, hexadecylsulphonate, toluenesulphonate, butylbenzenesulphonate, dodecylbenzenesulphonate, hexafluorophosphate, 7,8- or 7,9-dicarba-nido-undecaborate (1–).

These monomers are obtained by two-step direct quaternization of 4,4'-bipyridine. The first quaternization is carried out using an ω-halo-1-alcohol in aromatic hydrocarbons, preferably toluene or o-xylene, generally at from 100 to 200° C., preferably at from 120 to 160° C. The second quaternization is carried out using a primary halide, preferably benzyl halide, in an aprotic solvent, preferably N,N-dimethylformamide, N,N-dimethylacetamide or N-methyl-2-pyrrolidone, at elevated temperatures, generally at from 120 to 200° C., preferably at from 150 to 180° C. Ion exchange is subsequently carried out by precipitation in alcohol or by extraction from water using an organic solvent, such as toluene or methylene chloride.

Particular preference is also given to monomers which conform to the formula XXIX
in which
  $B^6$=o-, m- or p-C$_6$H$_4$—CH$_2$— or a mixture of the isomers,
  $X^1$=—CH=CH$_2$,

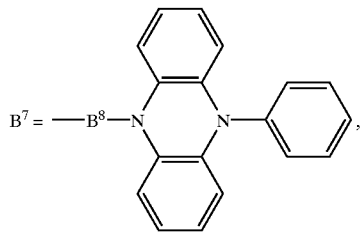

$X^2$ is absent, and
  $B^8$=—(CH$_2$)$_n$—,
  n=2–18 or $B^8$=o-, m- or p-CH$_2$—C$_6$H$_4$—CH$_2$—, and
  G$^-$ is halide, tetrafluoroborate, tetraphenylborate, cyanotriphenylborate, perchlorate, hexafluorophosphate, 7,8- or 7,9-dicarba-nido-undecaborate (1–).

These monomers are prepared in the following manner. Reaction of the phenazine with phenyllithium and subsequently with an α,ω-dihaloalkane or with an α,α'-haloxylene gives an (ω-haloalkyl)— or (α'-haloxylyl)-10-phenyl-5,10-dihydrophenazine. The reaction proceeds in anhydrous ethers, such as diethyl ether, THF, 1,2-dimeth- and 1,2-diethoxyethane, preferably in THF, at temperatures between –10° and 40° C., preferably at from 0° to 30° C., under an argon atmosphere. Quaternization of 4,4'-bipyridine using these products in acetonitrile at 70° C. gives 1-[ω-(10-phenyl-5,10-dihydro-5-phenazyl)alkyl]-4-(4'-pyridyl)pyridinium halide or 1-[α'-(10-phenyl-5,10-dihydro-5-phenazyl)-α-xylyl]-4-(4'-pyridyl)pyridinium halide. Finally, these substances are reacted with a vinylbenzyl halide, preferably with vinylbenzyl chloride or vinylbenzyl bromide, in N,N-dimethylformamide, N,N-dimethylacetamide or N-methyl-2-pyrrolidone, particularly preferably in N-methyl-2-pyrrolidone, at from 50 to 120° C. preferably at from 60° bis 80° C., under an argon atmosphere.

Particular preference is given to monomers which conform to the formula XXX

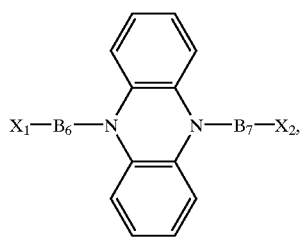

XXX in which
  $B^6=B^7$=—(CH$_2$)$_n$—,
  n=2–18,
  $B^6=B^7$=—(CH$_2$)$_2$—O—(CH$_2$)$_2$— or o-, m- or p-CH$_2$—C$_6$H$_4$—CH$_2$—, and
  $X^1=X^2$=halogen, preferably —Cl or —Br.

The preparation is carried out by reacting the phenazine with sodium in anhydrous ethers, such as 1,2-dimeth- and 1,2-diethoxyethane and diethylene glycol dimethyl ether, at temperatures between 40° and 140° C., preferably at from 70° to 130° C., under an argon atmosphere, and subsequently with a 2- to 5-fold excess of the corresponding dihalide at temperatures between 10° and 100° C., preferably at from 20° to 70° C.

Particular preference is also given to monomers which conform to the formula XXX
in which
  $B^6=B^7$=—(CH$_2$)$_n$—,
  n=2–18,
  $B^6=B^7$=—(CH$_2$)$_2$—O—(CH$_2$)$_2$— or o-, m- or p-CH$_2$—C$_6$H$_4$—CH$_2$—,
  $X^1=X^2$=—O—C(=O)-(C$_1$–C$_4$)-alkyl, —O—C(=O)—CH=CH$_2$, or —O—C(=O)—C(CH$_3$)=CH$_2$.

The preparation is carried out by reacting the dihalides of the monomers with the sodium or potassium salts of the corresponding acids in an anhydrous, aprotic solvent, such as N,N-dimethylformamide, N,N-dimethylacetamide, dimethyl sulphoxide, N-methyl-2-pyrrolidone or 1,3-dimethyltetrahydro-2(1H)-pyrimidinone, at elevated temperatures, generally at from 30 to 130° C., preferably at from 40 to 80° C., and with exclusion of air and water.

Particular preference is also given to monomers which conform to the formula XXX
in which $B^6$=—(CH$_2$)$_n$—, n=2–18, $B^7$=—Ph, substituted Ph or $C_nH_{2n+1}$, $X^1$=—O—C(=O)—CH=CH$_2$ or —O—C(=O)—C(CH$_3$)=CH$_2$, and $X^2$ is absent.

These monomers are prepared by the reaction between the above-mentioned (ω-haloalkyl)-10-phenyl-5,10-dihydrophenazine and the sodium or potassium salts of the corresponding acids in an anhydrous, aprotic solvent, such as N,N-dimethylformamide, N,N-dimethylacetamide, dimethyl sulphoxide, N-methyl-2-pyrrolidone or 1,3-dimethyltetrahydro-2(1H)-pyrimidinone, at elevated temperatures, generally at from 30 to 130° C., preferably at from 40 to 80° C., and with exclusion of air and water.

Particular preference is also given to monomers which conform to the formula XXX
in which $B^6$=—(CH$_2$)$_n$—, where n=2–11, $B^7$=—(C$_6$–C$_{10}$)-aryl, substituted -(C$_6$–C$_{10}$)-aryl, (C$_1$–C$_{18}$)-alkyl or (C$_7$–C$_{24}$)-aralkyl, $X^1$=—OH, and $X^2$ is absent.

These monomers are prepared by reaction of the phenazine with the corresponding lithium compound, for example with phenyllithium, and subsequently 1-bromo-ω-tetrahydropyranyloxyalkanes, at temperatures between –10° and 40° C., preferably at from 0° to 30° C., under an argon atmosphere, to give 5-(ω-tetrahydropyranyloxy-n-alkyl)-10-phenyl-5,10-dihydrophenazines. The reaction proceeds in anhydrous ethers, such as diethyl ether, THF, 1,2-dimeth- and 1,2-diethoxyethane, preferably in THF. The tetrahydropyranyl group is subsequently cleaved off by treatment with hydrochloric acid, benzene- or toluenesulphonic acid in a solvent, such as methanol, THF, dioxane, and in mixtures of the solvent with water, at from 10° to 100° C. under an argon atmosphere.

Particular preference is also given to monomers which conform to the formula XXX
in which $B_6$=$B^7$=—(CH$_2$)$_n$—, n=3–11, and $X^1$=$X^2$=—OH.

These monomers are prepared in the following manner. Reaction of the phenazine with sodium in anhydrous ethers, such as 1,2-dimeth- or 1,2-diethoxyethane or diethylene glycol dimethyl ether, at temperatures between 40° and 140° C., preferably at from 70° to 130° C., under an argon atmosphere, and subsequent reaction with 1-bromo-ω-tetrahydropyranyloxyalkanes at temperatures between 100 and 100° C., preferably at from 20° to 70° C., gives 5,10-bis(ω-tetrahydropyranyloxy-n-alkyl)-5,10-dihydrophenazines. The tetrahydropyranyl group is subsequently cleaved off by treatment with hydrochloric acid, benzene- or toluenesulphonic acid in a solvent, such as methanol, THF, dioxane, and in mixtures of the solvent with water, at from 10° to 30° C. under an argon atmosphere. The homologue in which n=3 is also prepared if trimethylene oxide is employed directly instead of the 5,10-bis(ω-tetrahydropyranyloxy-n-alkyl)-5,10-dihydrophenazine.

The other particularly preferred monomers which conform to the formula XXX
in which $B^6$=$B^7$=—CH$_2$—CH(C$_n$H$_{2n+1}$)—, n=1–18, and $X^1$=$X^2$=—OH are prepared analogously—by direct reaction of disodium dihydrophenazine with α-oxiranes.

The electrochromic system according to the invention can contain a solvent, preferably a dipolar aprotic solvent.

Suitable solvents are all solvents which are redox-inert under the selected voltages and which cannot eliminate electrophiles or nucleophiles or themselves react as sufficiently strong electrophiles or nucleophiles and so could react with the coloured free-radical ions. Examples are propylene carbonate, γ-butyrolactone, acetonitrile, propionitrile, glutaronitrile, methylglutaronitrile, 3,3'-oxydipropionitrile, hydroxypropionitrile, dimethylformamide, N-methylpyrrolidone, sulpholane, 3-methylsulpholane, or mixtures thereof. Preferences given to propylene carbonate and mixtures thereof with glutaronitrile and 3-methylsulpholane.

The polymers according to the invention are preferably soluble in at least one dipolar aprotic solvent, in particular at room temperature.

In a particularly preferred embodiment, the polymers according to the invention are soluble in the solvent present in the electrochromic system.

The electrochromic system according to the invention can contain at least one inert conductive salt.

Suitable inert conductive salts are lithium, sodium and tetraalkylammonium salts, in particular the latter. The alkyl groups can have from 1 to 18 carbon atoms and may be identical or different. Preference is given to tetrabutylammonium salts. Suitable anions for these salts, but also as anions G in the formulae (IX)–(XV), are all redox-inert, colourless anions.

Examples are tetrafluoroborate, tetraphenylborate, cyanotriphenylborate, tetramethoxyborate, tetraphenoxyborate, perchlorate, chloride, nitrate, sulphate, phosphate, methanesulphonate, ethanesulphonate, tetradecanesulphonate, pentadecanesulphonate, trifluoromethanesulphonate, perfluorobutanesulphonate, perfluorooctanesulphonate, benzenesulphonate, chlorobenzenesulphonate, toluenesulphonate, butylbenzenesulphonate, tert-butylbenzenesulphonate, dodecylbenzenesulphonate, naphthalenesulphonate, biphenylsulphonate, benzenedisulphonate, naphthalenedisulphonate, biphenyldisulphonate, nitrobenzenesulphonate, dichlorobenzenesulphonate, trifluoromethylbenzenesulphonate, hexafluorophosphate, hexafluoroarsenate, hexafluorosilicate, 7,8- or 7,9-dicarba-nido-undecaborate(1–) or (2–), which can optionally be substituted on the boron and/or carbon atoms by one or two methyl, ethyl, butyl or phenyl groups, dodecahydro-dicarbadodecoborate(2–) or B-methyl-C-phenyldodecahydrodicarbadodecarborate-(1–). In the case of polyvalent anions, $G^-$ is an equivalent of this anion, for example ½ SiF$_6$.

Preferred anions are tetrafluoroborate, pentadecanesulphonate, dodecylbenzenesulphonate, cyanotriphenylborate and 7,8-dicarba-nido-undecaborate(1–).

The conductive salts are preferably employed in the range from 0 to 1 molar.

As further additives, the electrochromic system can contain thickeners for controlling the viscosity. This can be important in order to avoid segregation, i.e. the formation of coloured streaks or spots on extended operation of an electrochromic device containing the electrochromic system according to the invention in the switched-on state and for controlling the fading rate after the current has been switched off.

Suitable thickeners are all the usual compounds for this purpose, for example polyacrylates, polymethacrylates (Luctite L®), polycarbonate and polyurethane.

Suitable further additives for the electrochromic system are UV absorbers for improving the light stability. Examples are Uvinul® 3000 (2,4-dihydroxybenzophenone, BASF), SANDUVOR® 3035 (2-hydroxy-4-n-octyloxybenzophenone, Clariant), Tinuvin® 571 (2-(2H-benzotriazol-2-yl)-6-dodecyl-4-methylphenol, Ciba), Cyasorb 24® (2,2'-dihydroxy-4-methoxybenzophenone, American Cyanamid Company), UVINUL® 3035 (ethyl 2-cyano-3,3-diphenylacrylate, BASF), Uvinul® 3039 (2-ethylhexyl 2-cyano-3,3-diphenylacrylate, BASF), UVINUL® 3088 (2-ethylhexyl 2-cyano-3,3-diphenylacrylate, BASF), UVINUL® 3088 (2-ethylhexyl p-methoxycinnamate, BASF), and CHIMASSORB®90 (2-hydroxy-2-methoxybenzophenone, Ciba).

The UV absorbers are employed in the range from 0.01 to 2 mol/l, preferably from 0.04 to 1 mol/l. They can also be employed as mixtures, for example UVINUL®3939 and CHIMASSORB®90.

The electrochromic system according to invention contains each of the substances of the formula (1), in particular of the formulae (II)–(VIII), in a concentration of at least $10^{-4}$ mol/l, preferably 0.001 mol/l. It is also possible to employ mixtures of a plurality of electrochromic substances of the formula (I).

The electrochromic system according to the invention is highly suitable as a constituent of an electrochromic device. Accordingly, the present invention furthermore relates to electrochromic devices containing the electrochromic system according to the invention. The construction of an electrochromic device, which can be in the form, for example, of a window pane, automobile sunroof, automobile rearview mirror or display, is known in principle. The electrochromic device according to the invention consists of two glass or plastic sheets which are transparent to light facing one another, one of which is optionally mirrored and whose sides facing one another have been provided with an electrically conductive coating, for example of indium-tin oxide (ITO), and between which the electrochromic system in accordance with the invention is located. Other suitable conductive materials are antimony-doped tin oxide, fluorine-doped tin oxide, antimony-doped zinc oxide, aluminium-doped zinc oxide, and tin oxide, and conductive organic polymers, such as optionally substituted polythienyls, polypyrroles, polyanilines, and polyacetylene. If one of the sheets is mirrored, this can also be utilized as the conductive layer, The electrochromic device according to the invention has, for example, the following construction. A distinction is made here between three basic types:

Type 1: full-area electrochromic device, for example for window panes,

Type 2: electrically darkenable mirrored devices, for example automobile mirrors, Type 3: electrochromic display devices, for example segment or matrix displays.

In type 2, use is made of glass or plastic sheets which are coated with a transparent conductive layer over the full area of one side.

In type 2, the sheets used are as in the case of type 1. In addition, one of the two sheets is mirrored. This mirroring can be applied to the second, non-conductively coated side of one of the two sheets. However, it can also be applied to one of the two sheets instead of the conductive coatings mentioned and can thus simultaneously take on the function of the conductive layer and of the mirroring. For the mirroring, silver, chromium, aluminium, palladium or rhodium or even palladium on chromium or rhodium on chromium or other known materials can be used. In this way, a reflective electrochromic device is obtained.

In the case of type 3, the construction can be selected as for type 1 or 2. In this way, a transmissive or reflective electrochromic display device is obtained. In any case, however, at least one of the two conductive layers is divided into electrically separate segments provided with individual contacts. However, it is also possible for only one of the two plates to be provided with a conductive coating and divided into segments. The segments can be separated, for example, by mechanical removal of the conductive layer, for example by scratching, scraping, shaving or milling, or chemically, for example by etching using, for example, a hydrochloric acid solution of $FeCl_2$ and $SnCl_2$. This removal of the conductive layer can be controlled locally via masks, for example comprising photoresist. However, it is also possible to produce the electrically separate segments by targeted application, for example by means of masks, for example by sputtering or printing, of the conductive layer. The segments are provided with contacts, for example by means of fine strips of conductive material, by means of which the segment is connected in an electrically conducting manner to a contact at the edge of the electrochromic device. These fine contact strips can consist of the same material as the conductive layer itself and can be produced, for example, during the division thereof into segments, as described above. However, they can also consist of another material, such as fine metallic conductors, for example of copper or silver, in order, for example, to improve the conductivity. A combination of metallic material and the material of the conductive coating is also possible. These metallic conductors can, for example, be applied, for example adhesively bonded, either in the form of fine wires, or can be printed-on. All these techniques just described are known in general terms from the production of liquid-crystal displays (LCDs).

The displays can be viewed in transmitted light or reflectively via mirroring.

The two plates are laid one on top of the other with the conductively coated sides which have been divided into segments facing one another, separated by, for example, a sealing ring, and are bonded to one another at the edge. The sealing ring can consist, for example, of plastic or thin glass or another material which is inert to the electrochromic liquid. However, the separation between the plates can also be established by means of other spacers, for example small plastic or glass beads or certain sand fractions, in which case these spacers are applied together with an adhesive and then jointly form the sealing ring. The sealing ring contains one or two gaps, which serve for Filling of the electrochromic device. The separation between the two plates is between 0.005 and 2 mm, preferably from 0.01 to 0.5 mm. In the case of large-area display devices, in particular made from plastic, it may be advantageous to keep the separation of the plates constant by means of spacers, for example plastic beads of the same diameter which are distributed over the area of the display device.

This display device is filled with the electrochromic system via the aperture in the sealing ring, it being necessary for all work to be carried out with exclusion of moisture and oxygen. The filling can take place, for example, by means of fine cannulas or alternatively by the vacuum filling method, in which the device and the liquid, placed in a flat dish, are introduced into a container which is capable of being evacuated. The container is evacuated. The display device, which only contains one filling aperture, is immersed with this aperture in the liquid. On removal of the vacuum, the liquid is forced into the display device.

The filling aperture is subsequently tightly sealed and adhesively bonded.

However, an alternative procedure is to apply the electrochromic system in the form of, for example, a solution or melt as a coating onto a conductively coated plate or film, for example using a knife coater or by spin coating. All or some of any solvent used is then removed. The second plate or film is then pressed onto the electro-chromic system by means of its conductive side, and the stand is adhesively bonded in a suitable manner. However, it is also possible for a conductive, for example metallic, coating to be vapour-deposited, sputtered or applied onto the electrochromic system by means of, for example, a dispersion. Examples are aluminium or conductive polymers, for example based on polythiophene.

If appropriate, the edge here must again be sealed using an adhesive or a resin.

All these operations must be carried out under an inert gas, for example $N_2$ or Ar, and with exclusion of moisture.

Special embodiments of the above-mentioned types 1 to 3 can be, for example, the following, which are likewise a subject matter of the invention:

Type 1: from the light protection/light filter area: window panes, for example for buildings, road vehicles, aircraft, railways, ships, roof glazing, automobile sunroofs, glazing of greenhouses and conservatories, light filters of any desired type;

From the security/confidentiality area: dividing screens, for example for room dividers in, for example, offices, road vehicles, aircraft, railways, sight protection screens, for example at bank counters, door glazing, visors, for example for motorcycle or pilot helmets;

From the design area: glazing of ovens, microwave equipment, other domestic appliances, furniture;

Type 2: mirrors of all types, for example for road vehicles, railways, in particular planar, spherical and aspherical mirrors and combinations thereof, for example spherical/aspherical mirror glazing in furniture.

Type 3: display devices of all types, for example segment or matrix displays, for example for watches, computers, electrical equipment, electronic equipment, such as radios, amplifiers, TV sets, CD players, destination displays in buses and trains, departure displays in stations and airports, flat screens, all applications mentioned under types 1 and 2 which contain at least one switchable static or variable display device, such as dividing screens containing displays such as, for example, "Please do not disturb", "Counter closed", for example automobile mirrors containing displays of any desired type, for example display of the temperature, faults in the vehicle (for example oil temperature, open doors), time, compass direction.

The self-extinguishing, single-cell electrochromic device according to the invention can, in addition to the electrochromic polymers of the formula (1), in particular of the formulae (II)–(VIII), described above, also contain other electrochromic polymers, as described, for example. in U.S. Pat. No. 4,902,108, Topics in Current Chemistry, Vol. 92, pp. 1–44 (1980), and Angew. Chem. 90, 927 (1978). Other suitable electrochromic mixture components are, for example, tetrazolium salts or complexes or salts of metal ions, for example $[Fe(C_5H_5)_2]^{0/1+}$. Admixture of such redox systems may be advantageous, for example in order to correct or intensify the hue, for example of the display, in the switched-on state in the electrochromic device according to the invention.

The polymers according to the invention can be used for the preparation of solutions of high colour density, which are advantageous for the production of thin display layers. These solutions furthermore enable the construction of electrochromic systems which are leak-proof, but nevertheless can be filled without problems.

The systems of the present invention do not separate out during continuous operation under gravity (for example convection), even in the case of large dimensions of the devices. Furthermore, the electrochromic polymers according to the invention have the advantage of being simple to produce.

The invention of the present application is explained in greater detail with reference to the examples below.

EXAMPLE 1

Synthesis of the Monomers 1.1. 5,10-bis(5-Bromo-n-pentyl)-5,10dihydrophenazine

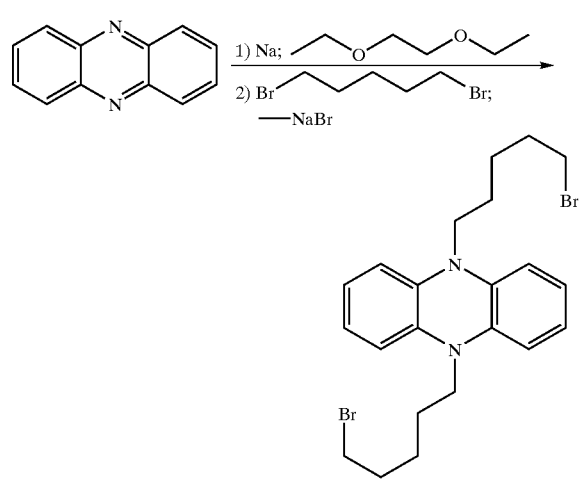

20 g (0.11 mol) of phenazine are dissolved in 400 ml of anhydrous 1,2-diethoxyethane at 80° C. under an argon atmosphere. 7.4 g of sodium are added. The reaction mixture is stirred vigorously at 120° C. under reflux for 24 hours and cooled to room temperature. A solution of 69 g (0.3 mol) of 60 in 100 ml of 1,2-diethoxyethane is poured rapidly into the resultant 5,10-disodium 5,10-dihydrophenazine suspension. After the reaction mixture has been stirred for 30 minutes, the precipitate is removed by filtration. All the anhydrous 1,2-diethoxyethane is distilled off using a rotary evaporator and used for the further synthesis. The product is purified by chromatography (silica gel column; cyclohexane/dioxane= 9/1) and recrystallized from 50 ml of n-butanol. The yield of the pale-yellow crystals is 11.7 g.

Elemental analysis: $C_{22}H_{28}Br_2N_2$ (480.3). Calc.: C, 55.02; H, 5.88; Br, 33.27; N, 5.83. Found: C, 55.10; H, 5.85; Br, 32.70; N, 5.80.

1.1a. A Byproduct in this Reaction is 1,5-di[5-(5-Bromopentyl)-5,10-dihydro-10-phenazyl]pentane,

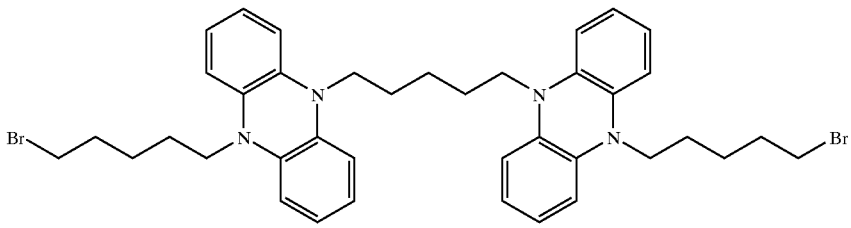

which is separated from the main product by chromatography. The yield is 3.5 g.

Elemental analysis: $C_{39}H_{46}Br_2N_4$ (730.64). Calc.: C, 64.11; H, 6.35; Br, 21.87; N, 7.67. Found: C, 64.60; H, 6.40; Br, 21.20; N, 7.70.

The following are prepared analogously:

1.2. 5,10-bis[2(2-Chloroethoxy)ethyl]-5,10-dihydrophenazine m.p.=105° C.; Elemental analysis: $C_{20}H_{24}Cl_2N_2O_2$ (395.33). Calc.: C, 60.76; H, 6.12; Cl, 7.94; N, 7.09. Found: C, 60.70; H, 6.20; Cl, 8.00; N, 7.10.

1.3. 5,10-bis[p-(Chloromethyl)benzyl]-5,10-dihydrophenazine m.p.=180° C. (with decomposition); Elemental analysis: $C_{28}H_{24}Cl_2N_2$ (459.42). Calc.: C, 73.20; H, 5.27; Cl, 5.43; N, 6.10. Found: C, 72.90; H, 5.60; Cl, 5.40; N, 5.90.

1.4. 5,10-bis[p-(Chloromethyl)benzyl]-5,10-dihydrophenazine m.p.=148–149° C.; Elemental analysis: $C_{28}H_{24}Cl_2N_2$ (459.42) Calc.: C, 73.20; H, 5.27; Cl, 5.43; N, 6.10. Found: C, 73.70; H, 5.40; Cl, 14.10; N, 6.20.

1.5 5,10-bis-[5-(Methacryloyloxy)pentyl]-5,10-dihydrophenazine

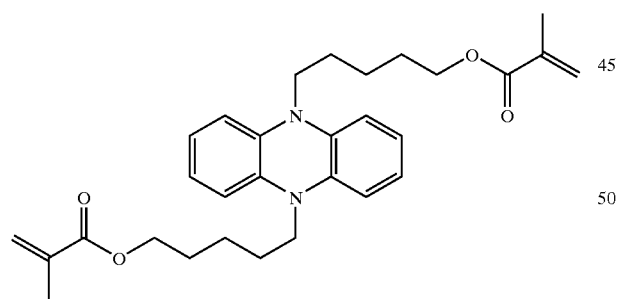

7.41 g (0.0182 mol) of monomer 1.1 and 4.52 g (0.0364 mol) of potassium methacrylate are stirred in 40 ml of DMPU for 2 hours at 100° C. under an argon atmosphere, transferred into a separating funnel, mixed with ether, washed a number of times with water and dried using magnesium sulphate. After the solvent has been removed by distillation, the product is purified by chromatography (silica gel column; cyclohexane/dioxane=9/1). The yield of the pale-green liquid is 4.2 g.

Elemental analysis: $C_{30}H_{38}N_2O_4$ (490.65). Calc.: C, 73.44; H, 7.81; N, 5.71. Found: C, 73.80; H, 8.00; N, 5.30.

1.6. 5-(4-Methacryloyloxybutyl)-10-phenyl-5,10-dihydrophenazine

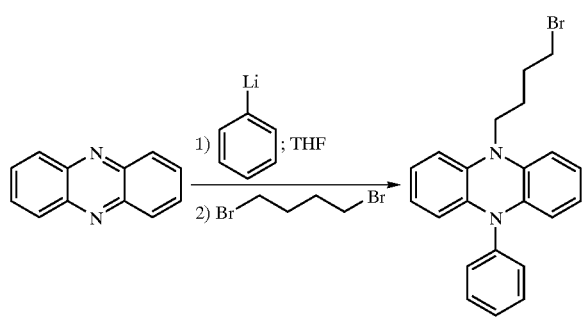

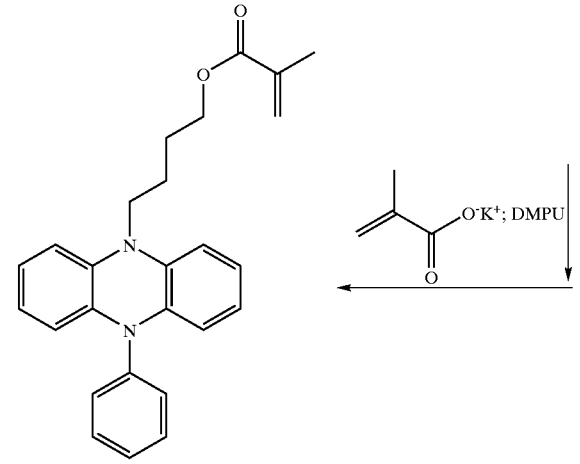

a) 29.9 g of phenazine are suspended in 195 ml of anhydrous THF under an argon atmosphere. 100 ml of 20% strength by weight phenyllithium solution in cyclohexane/diethyl ether (7:3) are added dropwise over the course of about 90 minutes, during which the temperature is held at a maximum of 35° C. The reaction solution is stirred at room temperature for a further 30 minutes. 98.2 ml of 1,4-dibromobutane are added in one portion at 15° C. After the mixture has been kept at room temperature for 6 hours, 600 ml of water are added, and the mixture is then acidified to pH 7.0. The organic phase is separated off, washed with water and evaporated under reduced pressure. Finally, excess 1,4-dibromobutane is distilled off at a pressure of 17 mbar. The residue is purified by chromatography (silica gel column; cyclohexane/dioxane=9/1). The yield of the yellow-green crystals of 5-(4-bromobutyl)-10-phenyl-5,10-dihydrophenazine is 23.6 g. m.p.=115° C.;

Elemental analysis: $C_{22}H_{21}BrN_2$ (393.33). Calc.: C, 67.18; H, 5.38; N, 7.12. Found: C, 67.10; H, 5.70; N, 6.70.

b) 12.0 g (0.0305 mol) of this product and 7.57 g (0.0610 mol) of potassium methacrylate are stirred in 40 ml of DMPU for 2 hours at 100° C. under an argon atmosphere and treated further analogously to 1.5 6.4 g of yellow-green crystals are obtained.
m.p.=73° C.;
Elemental analysis: $C_{26}H_{26}N_2O_2$ (398.51). Calc.: C, 78.36; H, 6.58; N, 7.03. Found: C, 78.70; H, 6.60; N, 7.00.

1.6.1. 5-(3-Hydroxypropyl)-10-phenyl-5,10-dihydrophenazine

Elemental analysis: $C_{21}H_{20}N_2O$ (31 6.41). Calc.: C, 79.72; H, 6.37; N, 8.85. Found: C, 79.30; H, 6.60; N, 8.80.

1.6.2. 5-(11-Hydroxyundecyl)-10-phenyl-5,10-dihydrophenazine
m.p.=70° C.;
Elemental analysis: $C_{29}H_{36}N_2O_2$ (428.62). Calc.: C, 81.27; H, 8.47; N, 6.54. Found: C, 80.00; H, 8.60; N, 6.60.

is prepared analogously.

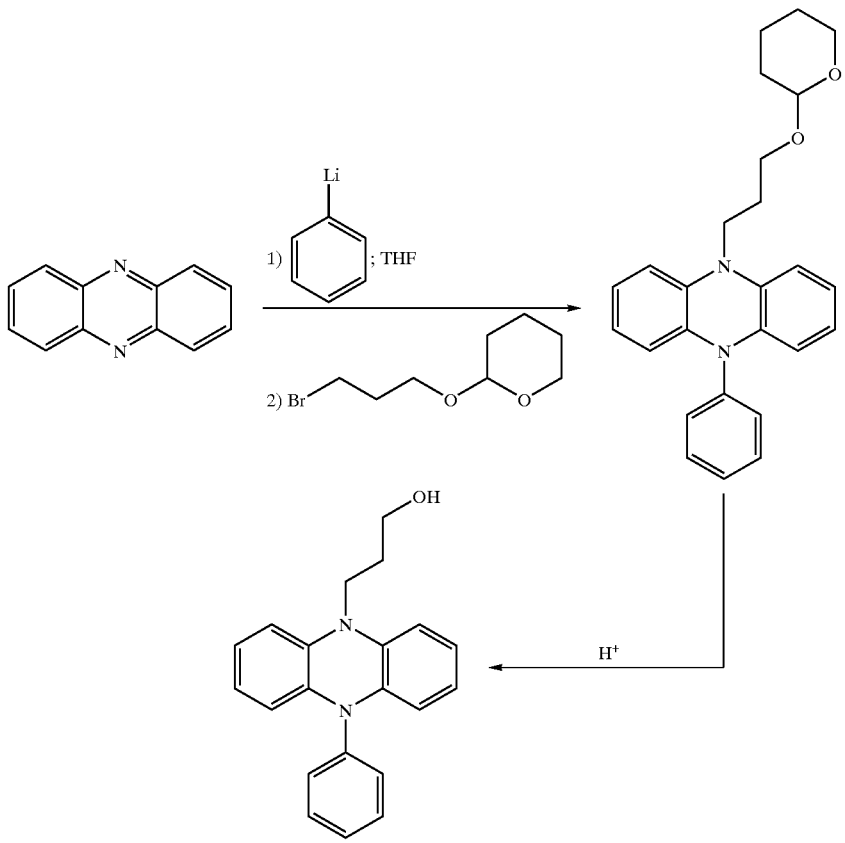

The synthesis is carried out analogously to 1.6a, but with addition of 1-bromo-3-tetrahydropyranyloxypropane instead of 1,4-dibromobutane. Purification is carried out by chromatography ($Al_2O_3$ column; cyclohexane/dioxane 9/1) with subsequent crystallization from methanol. The yield of pale-green crystals of 5-(3-tetrahydropyranyloxy-n-propyl-10-phenyl-5,10-dihydrophenazine is 42% of theory.

36 g of this product and 25.7 g of p-toluenesulphonic acid monohydrate are refluxed for 2 hours in 300 ml of methanol. The reaction mixture is neutralized using $NaHCO_3$, chloroform is added, and the mixture is washed twice with water and dried using magnesium sulphate. After the solvent has been removed by distillation, the product is purified by chromatography (silica gel column; cyclohexane/dioxane= 7/3) and crystallized from methanol. The yield of pale-green crystals is 14.2 g.
m.p.=135° C.;

1.7. 5,10-bis(2-Hydroxypropyl)-5,10-dihydrophenazine

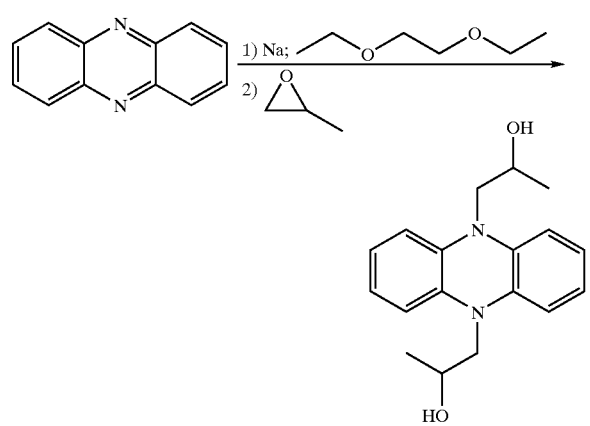

40 g (0.22 mol) of phenazine are dissolved in 500 ml of anhydrous 1,2-diethoxyethane at 80° C. under an argon atmosphere. 14 g of sodium are added. The reaction mixture is stirred vigorously under reflux at 120° C. for 24 hours and cooled to room temperature. A solution of 39 g (0.66 mol) of 1,2-propylene oxide in 50 ml of 1,2-diethoxyethane is poured into the resultant 5,10-disodium 5,10-dihydrophenazine suspension. After the reaction mixture has been stirred at room temperature for 1 hour and at 50° C. for 2 hours, the precipitate is removed by filtration. All the anhydrous 1,2-diethoxyethane is distilled off on a rotary evaporator and used for the further synthesis. The solid residue, together with filtered-off precipitate, is mixed with 500 ml of methanol, and the mixture is stirred for 30 minutes. The solution is then evaporated on a rotary evaporator and transferred into a separating funnel, chloroform is added, and the mixture is washed a number of times with water and dried using magnesium sulphate. After the solvent has been distilled off, the product is purified by chromatography (silica gel column; cyclohexane/dioxane=1/1) and recrystallized from 150 ml of an acetone/water (2/1) mixture. The yield of the pale-green crystals is 22.5 g.

m.p.=156° C.;

Elemental analysis: $C_{18}H_{22}N_2O_2$ (298.39). Calc.: C, 72.46; H, 7.43; N, 9.39. Found: C, 72.50; H, 7.30; N, 9.20.

The following are prepared analogously:

1.8. 5,10-bis(2-hydroxyethyl)-5,10-dihydrophenazine m.p.=179° C.;

Elemental analysis: $C_{16}H_{18}N_2O_2$ (270.33). Calc.: C, 71.09; H, 6.71; N, 10.36. Found: C, 71.00; H, 6.50; N, 10.10.

1.9. 5,10-bis(3-Hydroxypropyl)-5,10-dihydrophenazine *

* According to mass spectroscopy and elemental analysis data, contains about 30% of 5-(3-hydroxypropyl)-10-[3-(3-hydroxypropoxy)propyl]-5,10-dihydrophenazine
m.p.=158° C.

1.9a. 5,10-bis(3-Hydroxypropyl)-5,10-dihydrophenazine

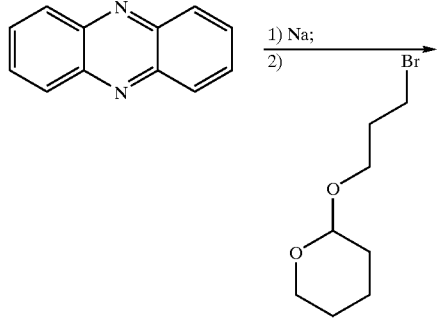

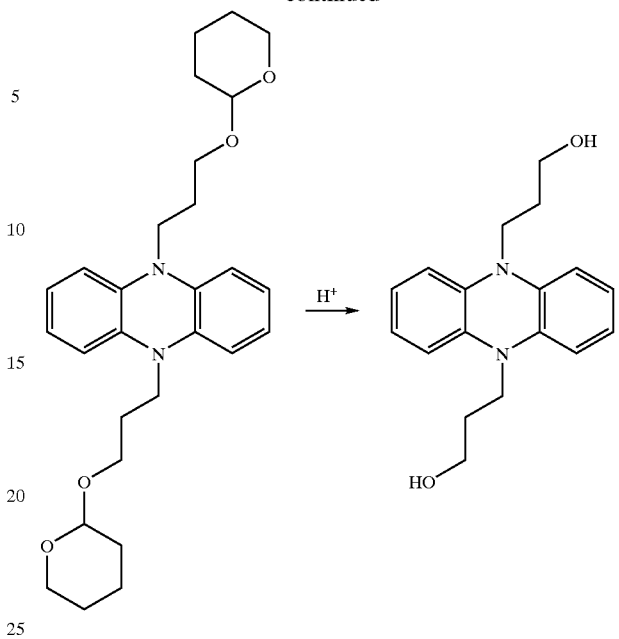

Disodium dihydrophenazine, prepared analogously to 1.7 from 20 g of phenazine and 7 g of sodium, is reacted with 53 g of 1-bromo-3-tetrahydropyranyloxypropane. The further treatment is carried out analogously to 1.1. 16.8 g of colourless crystals of 5,10-bis(3-tetrahydropyranyloxy-n-propyl)-5,10-dihydrophenazine are obtained.

m.p.=80° C.;

Elemental analysis: $C_{28}H_{38}N_2O_4$ (466.63). Calc.: C, 72.07; H, 8.21; N, 6.00. Found: C, 72.20; H, 8.20; N, 5.90.

5 g of this product are stirred at room temperature for 24 hours in 36 ml of a mixture of 2N HCl and THF (1:10). The reaction mixture is neutralized using $NaHCO_3$, chloroform is added, and the mixture is washed twice with water and dried using magnesium sulphate. The further treatment is carried out analogously to 1.7. The yield of the pale-green crystals is 0.7 g.

m.p. 154° C.

1.9b. 5,10-bis(6-Hydroxyhexyl)-5,10-dihydrophenazine m.p.=95° C.;

Elemental analysis: $C_{24}H_{34}N_2O_2$ (382.55). Calc.: C, 75.35; H, 8.96; N, 7.32. Found: C, 75.30; H, 8.70; N, 7.20 and 1.9c. 5,10-bis(11-Hydroxyundecyl)-5,10-dihydrophenazine m.p.=86° C.;

Elemental analysis: $C_{34}H_{54}N_2O_2$ (522.82). Calc.: C, 78.11; H, 10.41; N, 5.36. Found: C, 78.10; H, 10.30; N, 5.30 are prepared analogously.

1.10. 1,1'-Di[p-(Chloromethyl)benzyl]-4,4'-bipyridinium Difluoroborate

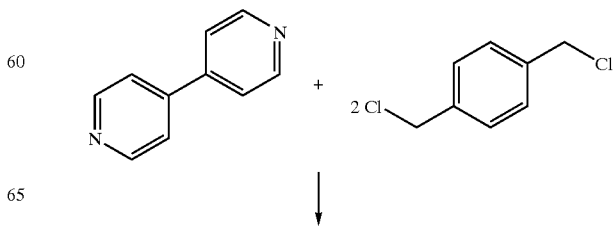

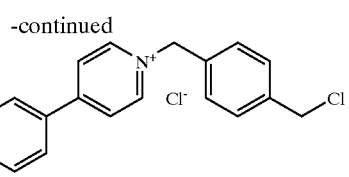

a) 34.3 g (0.22 mol) of 4,4'-bipyridyl and 106 g (0.66 mol) of α,α'-dichloro-p-xylene are stirred in 500 ml of acetonitrile at 90° C. for 4 hours under an argon atmosphere. After cooling, the precipitate is filtered off and washed sufficiently with acetonitrile. Drying gives 88.1 g of 1,1'-di[p-(chloromethyl)benzyl]-4,4'-bipyridinium dichloride.

b) 50.6 g of this substance are dissolved in 200 ml of methanol. A concentrated solution of 131 g (0.4 mol) of tetrabutylammonium tetrafluoroborate in methanol is added. After one hour, the white precipitate is filtered off, washed with methanol and dried. The yield of monomer 1.10 is 40 g.

Elemental analysis: $C_{26}H_{24}B_2Cl_2F_8N_2$ (609.01). Calc.: C, 51.28; H, 3.97; N, 4.60. Found: C, 50.40; H, 4.20; N, 4.70.

1.11. 1,1'-di(11-Hydroxyundecyl)-4,4'-bipyridinium Dibromide

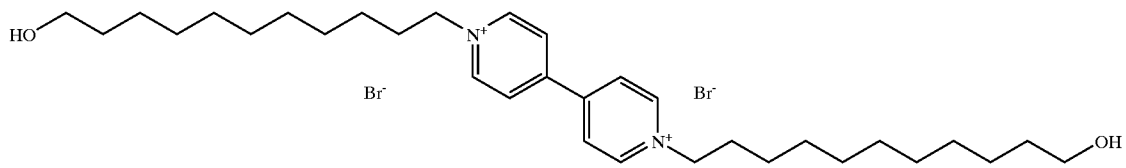

is prepared analogously to 1.10a using DMF in place of acetonitrile and at 160° C. in the reaction time of 2 hours.

Elemental analysis: $C_{32}H_{54}Br_2N_2O_2$ (658.61). Calc.: C, 58.36; H, 8.26; Br, 24.26; N, 4.25. Found: C, 58.20; H, 8.20; Br, 24.10; N, 4.25.

The following monomers are prepared analogously to 1.10b on the basis of the product from 1.11:

1.12. 1,1'-di(11-Hydroxyundecyl)-4,4'-bipyridinium Difluoroborate

Elemental analysis: $C_{32}H_{54}B_2F_8N_2O_2$ (672.4). Calc.: C, 57.16; H, 8.09; N, 4.17. Found: C, 58.20; H, 8.50; N, 4.20.

1.13. 1,1'-di(11-Hydroxyundecyl)-4,4'-bipyridinium Ditetraphenylborate

Elemental analysis: $C_{80}H_{94}B_2N_2O_2$ (1137.28). Calc.: C, 84.49; H, 8.33; N, 2.46. Found: C, 84.50; H, 8.50; N, 2.50.

1.14. 1,1-di(11-Hydroxyundecyl)-4,4'-bipyridinium di(cyanotriphenylborate)

Elemental analysis: $C_{70}H_{84}B_2N_4O_2$ (1035.1). Calc.: C, 81.23; H, 8.18; N, 5.41. Found: C, 80.70; H, 8.20; N, 5.20.

1.15. 1,1'-di(11-Hydroxyundecyl)-4,4'-bipyridinium Didodecylsulphonate 20 g (0.03 mol) of the monomer 1.9 and 19.8 g (0.072mol) of sodium dodecylsulphonate are dissolved in 150 ml of a methanol/water mixture (1:2) while stirring under reflux. This solution is added to a two-phase system comprising 600 ml of methylene chloride and 200 ml of water, and the mixture is stirred vigorously under reflux for 2 hours. After cooling, the organic layer is separated off and evaporated to dryness under reduced pressure. The residue is washed with acetone, dried at room temperature under reduced pressure and at 150° C. under a high vacuum ($10^{-3}$ mbar) for 5 hours. The yield is 20.6 g.

Elemental analysis: $C_{56}H_{104}N_2O_8S_2$ (997.6). Calc.: C, 67.42; H, 10.51; N, 2.81. Found: C, 65.80; H, 10.50; N, 2.50.

1.16. 1,1'-di(11-Hydroxyundecyl)-4,4'-bipyridinium Dihexadecylsulphonate is Prepared Analogously.

1.17. 1-(Vinylbenzyl)-1'-benzyl-4,4'-bipyridinium Dichloride

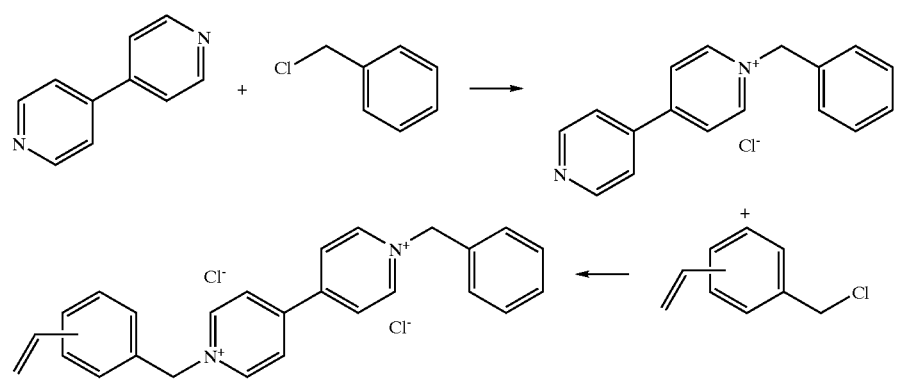

a) 15.6 g of 4,4'-bipyridyl and 12.7 g of benzyl chloride are stirred in 300 ml of toluene under reflux for 4 hours. The precipitate is filtered off from the hot solution, washed with abundant hot toluene and dried under reduced pressure. The yield of 1-benzyl-4-(4'-pyridyl)-pyridinium chloride is 25.2 g.

Elemental analysis: $C_{17}H_{15}N_2Cl$ (282.78). Calc.: C, 71.21; H, 5.35; N, 9.91; Cl 12.54. Found: C, 71.90; H, 5.60; N, 9.70; Cl 12.60.

b) 20 g (0.056 mol) of this product are dissolved in 200 ml DMF at 150° C., 10.3 g (0.067 mol) of vinylbenzyl chloride are added, and the reaction mixture is stirred for 4 hours. After the mixture has been cooled to 100° C., the precipitate is filtered off, washed with DMF and toluene and dried. The pink product is stirred for 15 minutes in water containing activated carbon, freed from the activated carbon by filtration, and evaporated to dryness under reduced pressure. The yield of pale-yellow 1-(vinylbenzyl)-1'-benzyl-4,4'-bipyridinium dichloride is 15.3 g.

The following monomers are prepared analogously to 1.10b on the basis of this product:

1.18. 1-(Vinylbenzyl)-1'-benzyl-4,4'-bipyridinium Difluoroborate

Elemental analysis: $C_{26}H_{24}B_2N_2F_8$ (538.09). Calc.: C, 58.04; H, 4.50; N, 5.21. Found: C, 57.10; H, 4.60; N, 5.30.

1.19 1-(Vinylbenzyl)-1'-benzyl-4,4'-bipyridinium Ditetraphenylborate 1.20. 1-(Vinylbenzyl)-1'-[4-(10-phenyl-5,10-dihydro-5-phenazyl)-butyl]-4,4'-bipyridinium Difluoroborate

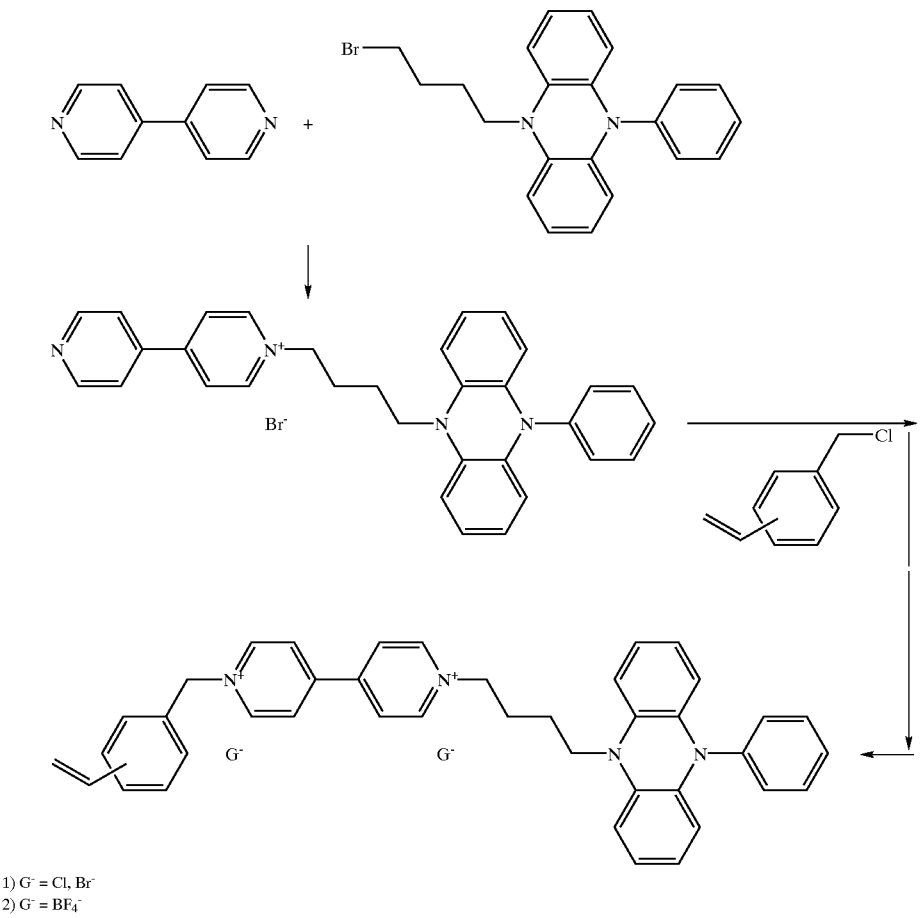

1) $G^- = Cl^-, Br^-$
2) $G^- = BF_4^-$ a) 20.3 g of 4,4'-bipyridyl and 24.9 g of 5-(4-bromobutyl)-10-phenyl-5,10-dihydrophenazine (1.6.a) are stirred in 330 ml. of at 70° C. for 24 hours under an argon atmosphere. The mixture is cooled and filtered with suction, and the product is washed with 150 ml of acetone. Drying gives 28.6 g of 1-[4-(10-phenyl-5,10-dihydro-5-phenazyl)-butyl]-4-(4'-pyridyl)pyridinium bromide Elemental analysis: $C_{32}H_{29}N_4Br$ (549.51). Calc.: C, 69.94; H, 5.32; N, 10.20; Br, 14.54. Found: C, 69.60; H, 5.50; N, 10.00; Br, 14.90.

b) 27 g of this product and 38 ml of vinylbenzyl chloride are stirred in 310 ml of N-methyl-2-pyrrolidone at 70° C. for 15 hours under an argon atmosphere. The mixture is cooled and diluted with 600 ml of toluene. The precipitated product is filtered off, washed with toluene and hexane, and dried under reduced pressure, giving 21.2 g of a dark-grey product. 3.95 g thereof are dissolved in 100 ml of methanol, and a methanol solution of 18.2 g of tetrabutylammonium tetrafluoroborate is added. The pale-green product which precipitates out is filtered off, washed with abundant methanol, and dried. The yield is 1.35 g.

Elemental analysis: $C_{41}H_{38}B_2F_8N_4$ (760.39). Calc.: C, 64.76; H, 5.04; N, 7.37. Found: C, 64.40; H, 5.30; N, 7.30.

1.21. 1-(Vinylbenzyl)-1'-[4-(10-phenyl-5,10-dihydro-5-phenazyl)-butyl]-4,4'bi-pyridinium Ditetraphenylborate is Prepared Analogously.

1.22. 1-(11-Hydroxyundecyl)-1'-benzyl-4,4'-bipyridinium Dibromide

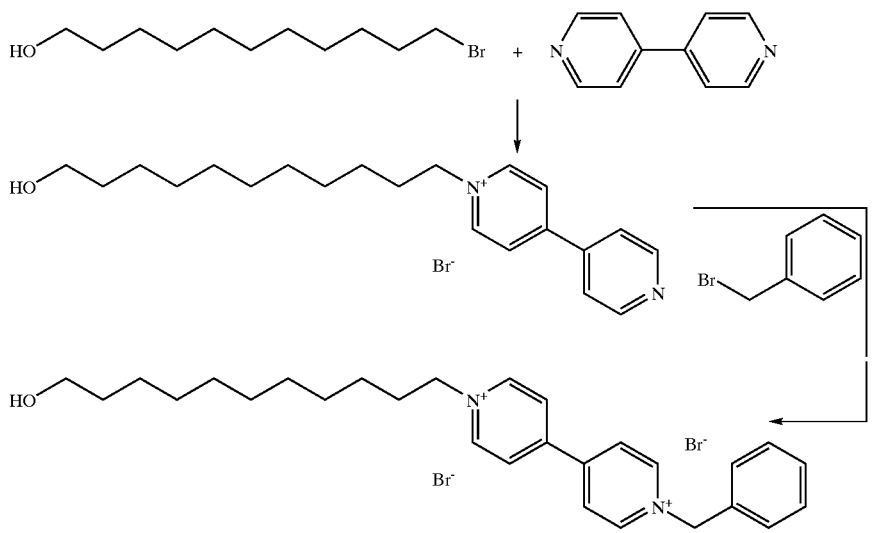

a) 70 g of 11-bromoundecanol in 50 ml of o-xylene are added with stirring to a refluxing solution of 56.6 g (30% excess) of 4,4'-bipyridyl in 100 ml of o-xylene, and the reaction mixture is stirred for a further 2 hours. After the mixture has been cooled to 100° C., the precipitate is filtered off from the hot solution, washed with hot o-xylene and subsequently with abundant toluene, and dried under reduced pressure. The yield of 1-(1-hydroxyundecyl)-4-(4'-pyridyl)pyridinium bromide is 83 g.

Elemental analysis: $C_{21}H_{12}BrN_2O$ (408.4). Calc.: C, 61.76; H, 7.90; Br, 19.56; N, 6.86. Found: C, 61.20; H, 7.70; Br, 20.20; N, 6.70.

b) 35 g of this product are dissolved in 100 ml of N-methyl-2-pyrrolidone at 150° C. 17.7 g of benzyl bromide are added dropwise to this solution. The reaction mixture is stirred for a further 0.5 hour. After the mixture has been cooled to 100° C., the precipitate is filtered off from the hot solution, washed with abundant hot NMP and subsequently with abundant hot dioxane, and dried under reduced pressure. The yield of the pale-yellow product is 50 g.

The following monomers are prepared analogously on the basis of this product 1.10b:

1.23. 1-(11-Hydroxyundecyl)-1'-benzyl-4,4'-bipyridinium Difluoroborate

Elemental analysis: $C_{28}H_{38}B_2F_8N_2O$ (592.23). Calc.: C, 56.79; H, 6.47; N, 4.73. Found: C, 56.80; H, 6.40; N, 4.70.

1.24. 1-(11-Hydroxyundecyl)-1'-benzyl-4,4'-bipyridinium di(Cyanotriphenylborate)

Elemental analysis: $C_{66}H_{68}B_2N_4O$ (954.93). Calc.: C, 83.02; H, 7.18; N, 5.87. Found: C, 82.60; H, 7.20; N, 5.90.

EXAMPLE 2

Synthesis of the Polymers

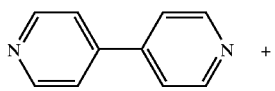

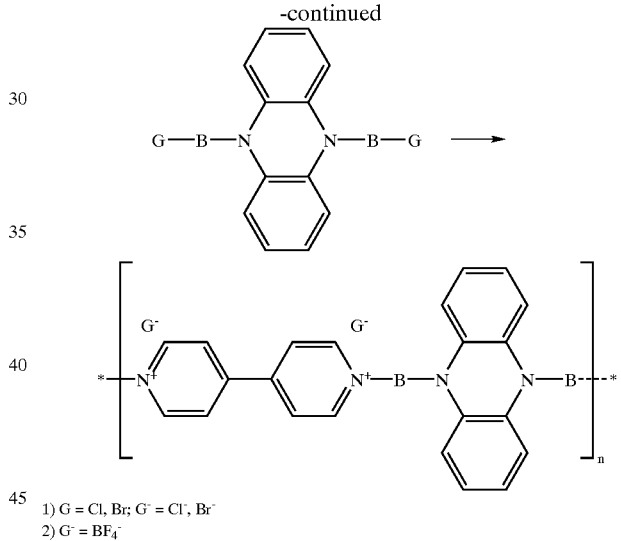

1) $G = Cl, Br$; $G^- = Cl^-, Br^-$
2) $G^- = BF_4^-$ 2.1. $B = -(CH_2)_5-$; $G^- = BF_4^-$ 3.25 g (0.0208 mol) of 4,4'-bipyridine and 10 g (0.0208 mol) of monomer 1.1 are stirred for 4 hours in 30 ml of diethylene glycol at 180° C. under an argon atmosphere and cooled, 300 ml of dioxane are added, and the mixture is refluxed for 30 minutes. The precipitate is separated off from the solution and dissolved in 50 ml of methanol. This solution is added dropwise with good stirring to a solution of 30 g of tetrabutylammonium tetrafluoroborate in 300 ml of methanol.

A green precipitate is filtered off with suction, washed a number of times with methanol, and dried under reduced pressure. Yield: 8.2 g.

The polymer 2.2. B=—(CH$_2$)$_2$—O—(CH$_2$)$_2$—; G$^-$=BF$_4^-$ is prepared analogously on the basis of monomer 1.2.

2.3. B=p-(—CH$_2$—C$_6$H$_4$—CH$_2$—); G$^-$=BF$_4^-$ 3.4 g (0.0218 mol) of 4,4'-bipyridine and 10 g (0.0218 mol) of monomer 1.3 are stirred for 24 hours in 30 ml of DMF at 50° C. under an argon atmosphere. The remainder of the synthesis is analogous to 2.1. Yield: 12.7 g.

The polymer 2.4. B=m-(—CH$_2$—C$_6$H$_4$—CH$_2$—); G$^-$=BF$_4^-$ is prepared analogously on the basis of monomer 1.4.

In an electrochromic device as described in Example 10, a grey-blue coloration with absorption maxima at 453, 482, 565, 606 and 662 nm is obtained for the polymer 2.4.

All other polymers from Example 3 exhibit a similar blue-green coloration under these conditions, with a plurality of absorption maxima, the two strongest of which are in the ranges 455–490 nm and 590–620 nm.

2.5. 1.0 g (0.00217 mol) of monomer 1.3, 1.32 g (0.00217 mol) of monomer 1.10 and 0.801 g (0.00435 mol) of 1,2-bis(4-pyridyl)ethane are stirred in 10 ml of DMF at 80° C. for 4 hours under an argon atmosphere:

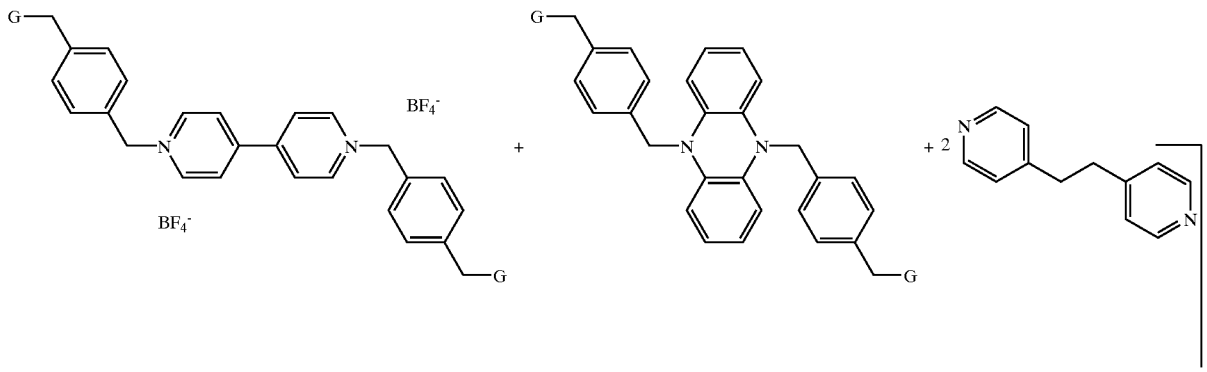

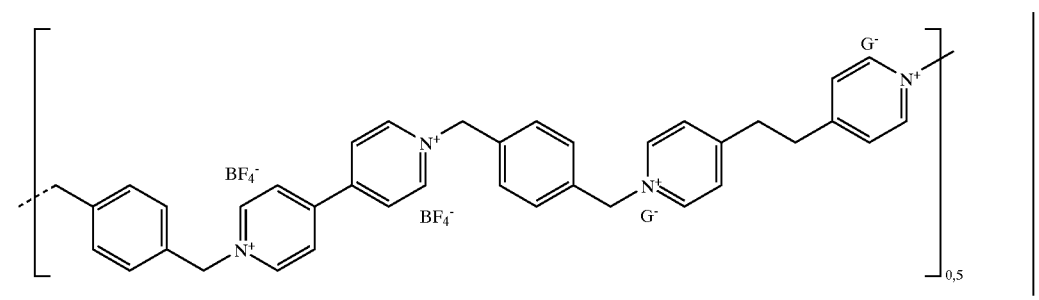

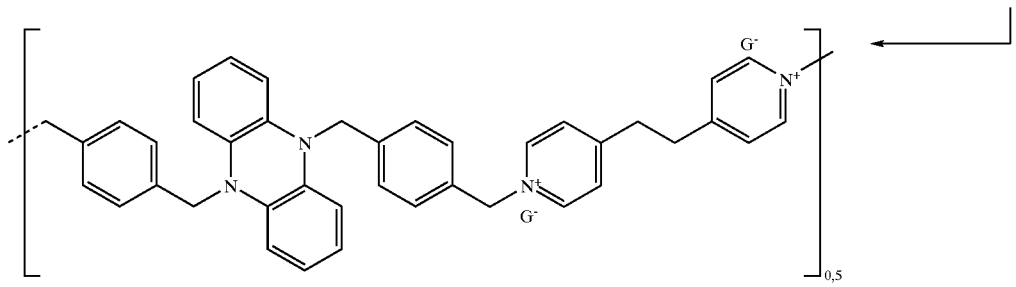

1) G = Cl, G$^-$ = Cl$^-$,
2) G$^-$ = BF$_4^-$

The reaction mixture is evaporated to dryness under reduced pressure and treated further analogously to 2.1. Yield 0.9 g.
2.6. 5.72 g (0.005 mol) of monomer 1.13, 1.5 g (0.005 mol) of monomer 1.7 and 2.52 g (0.01 mol) of 4,4'-methylenebis(phenyl isocyanate) are stirred in 15 ml of DMF at 80° C. for 48 hours under an argon atmosphere.
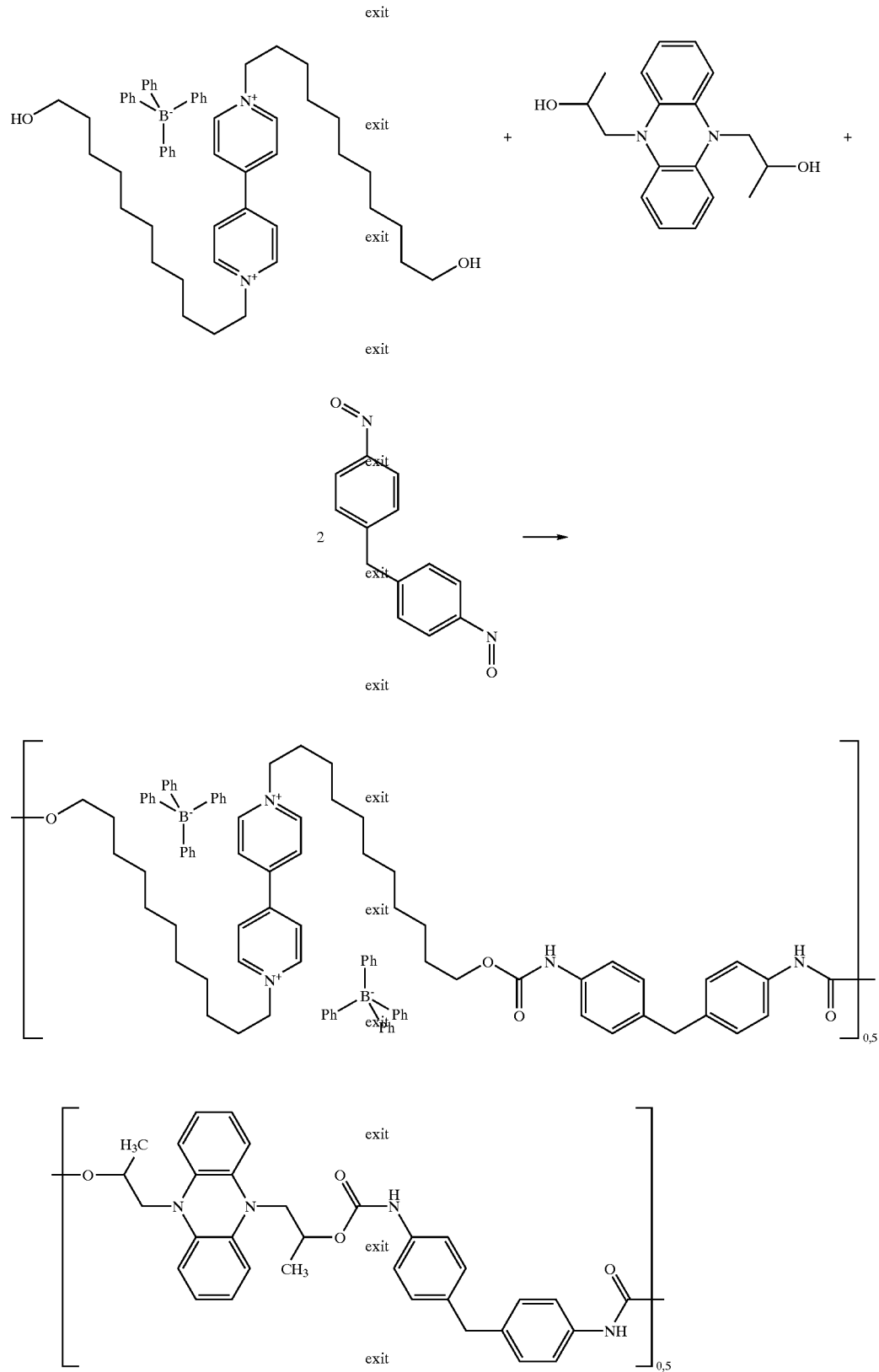

The reaction mixture is evaporated to dryness under reduced pressure. The residue is boiled three times with methanol, filtered off and dried under reduced pressure. The yield is 7.78 g.

2.7. is prepared analogously to 2.6 from the monomers 1.12 and 1.7. Yield: 66.8% of theory.

EXAMPLE 3

Synthesis of the Polymers 3.1. $G^-=BF_4^-$:

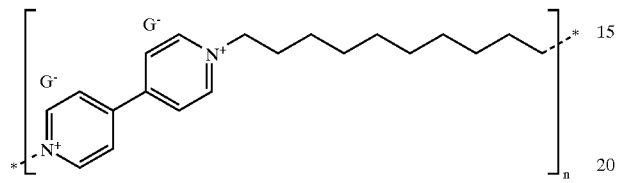

9.4 g (0.06 mol) of 4,4'-bipyridine and 18 g (0.06 mol) of 1,10-dibromodecane are stirred in 30 ml of diethylene glycol at 190° C. for 4 hours under an argon atmosphere and cooled, 300 ml of dioxane are added, and the mixture is refluxed for 30 minutes. The precipitate is separated off from the solution and dissolved in 100 ml of methanol. This solution is added dropwise with good stirring to the solution of 60 g of tetrabutylammonium tetrafluoroborate in 600 ml of methanol. A precipitate is filtered off with suction, washed a number of times with methanol, and dried under reduced pressure. Yield: 5.0 g.

In an electrochromic device as described in Example 5, a blue-green coloration with absorption maxima at 435, 450, 462, 570, 604 and 660 nm is achieved for the polymer 3.1 in a solution with 5,10-dimethyl-5,10-dihydrophenazine.

All other polymers from Example 3 exhibit a similar blue-green coloration under these conditions, with a plurality of absorption maxima, the most intense of which are in the regions 455–490 mn and 590–620 nm.

3.2. A polymer having the following structure:

is prepared analogously to 2.6 from 3 g (0.00264 mol) of monomer 1.13 and 0.66 g (0.00264 mol) of 4,4'-methylenebis(phenyl isocyanate). The yield is 3.3 g.

3.3. A polymer in which $G^-=BF_4^-$ is prepared analogously to 3.2 from 5.45 g (0.0081 mol) of monomer 1.12 and 2.03 g (0.0081 mol) of 4,4'-methylenebis-(phenyl isocyanate). The yield is 2.2 g.

3.4. $G^-=BF_4^-$:

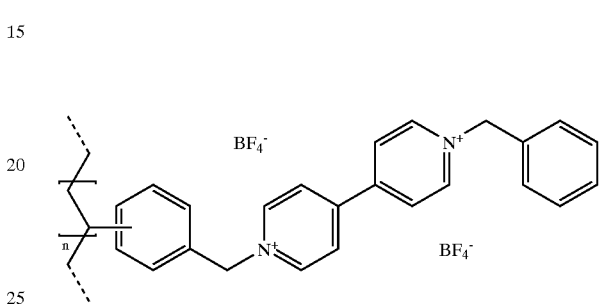

1.0 g of monomer 1.18 and 0.05 g of α,α'-azoisobutyronitrile are stirred in 10 ml of DMF at 70° C. for 48 hours under an argon atmosphere, and evaporated to dryness under reduced pressure. The residue is boiled three times with methanol, filtered off, and dried under reduced pressure. The yield is 0.09 g.

EXAMPLE 4

Synthesis of the Polymers 4.1. 2 g (0.00435 mol) of monomer 1.3 and 1.325 g (0.00435 mol) of 4,4'-iso-propylidenediphenol dipotassium salt:

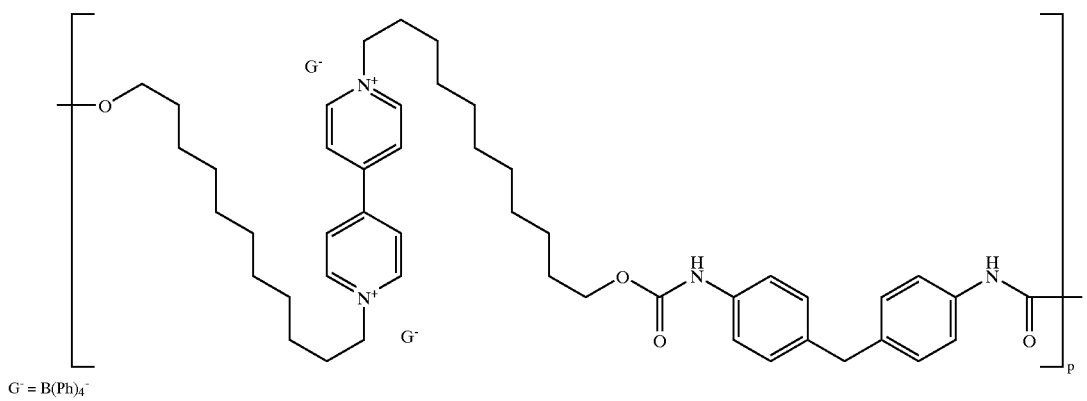

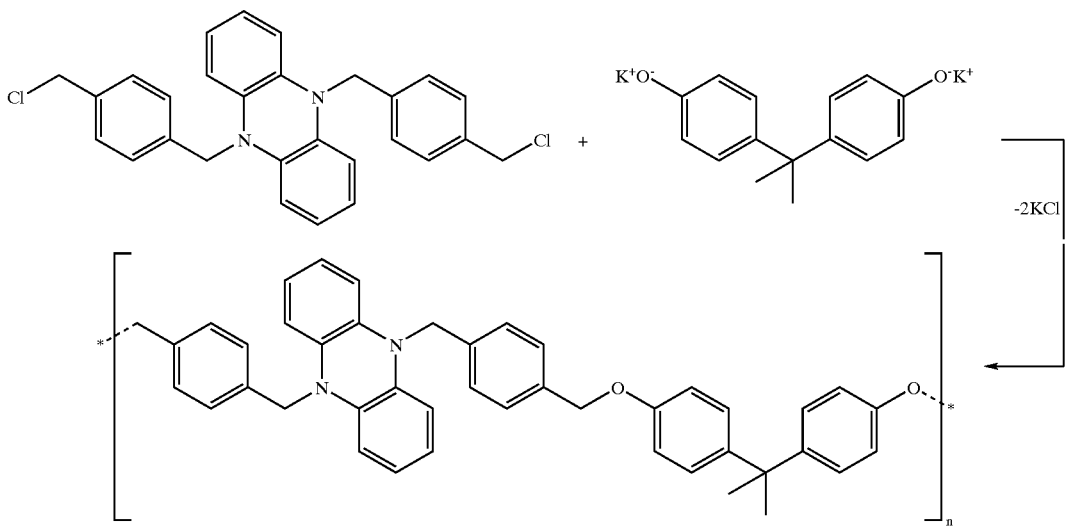

are stirred in 6 ml of 1,3-dimethyl-3,4,5,6-tetrahydro-2(1H)-pyrimidinone at 110° C. for 4 hours under an argon atmosphere and cooled, and 200 ml of water are added. The precipitate is separated off from the solution, refluxed a number of times in methanol, and dried at 150° C. for 2 hours under a high vacuum. Yield: 0.65 g.

4.2. The polymer of the following structure:

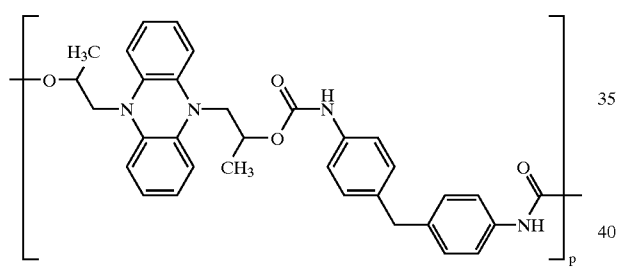

is prepared analogously to 3.2 from monomer 1.7 and 4,4'-methylenebis(phenyl isocyanate). Yield: 43% of theory.

EXAMPLE 5

An electrochromic cell was constructed from two ITO-coated glass plates and a scaling ring (thickness 0.2 mm), as described in U.S. Pat. No. 4,902,108 in Examples 1 to 3. It was filled with a solution of 94 mg of the polymeric electrochromic compound 3.1 and 42 mg of the dihydrophenazine of the formula

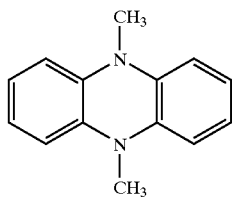

in 10 ml of anhydrous propylene carbonate via an aperture in the ceiling ring. The colour of the solution in the cell was pale yellow. After application of a voltage of 0.9 V, the solution rapidly became a blue-green colour, and when the current supply was switched off, the cell contents became colourless again within about 30 seconds and resulted in the original pale yellow colour. More than 100,000 switching cycles of this type were survived without any changes.

The blue-green coloration exhibited absorption maxima at 435, 450, 462, 570, 604 and 660 nm.

When the glass sheet was silvered on the side opposite the ITO-coated side, a darkenable mirror was obtained.

EXAMPLE 6

An experiment was carried out as described in Example 5 using polymer 3.3 instead of polymer 3.1. After application of a direct voltage of 0.9 V, the pale-yellow cell contents rapidly became a greenish blue colour. This colour disappeared again after the voltage was switched off, with short-circuiting of the cell resulting in faster decoloration.

EXAMPLE 7

An electrochromic cell was constructed from two ITO-coated glass plates. This was carried out using a suitable adhesive as sealant material into which the spacer (finely ground quartz sand having a defined distribution of the particle diameter d(max.)=200 μm) had been stirred.

The filling of the cell with a solution which was a 0.02 molar with respect to the polymeric electrochromic compound 2.7 in anhydrous dimethylformamide (DMF) was carried out under a nitrogen atmosphere in a glove box. The cell was sealed, likewise in the glove box, using a suitable sealant material. The cell contents were pale yellow to colourless before application of a voltage. After application of a direct voltage of 0.9 V, the cell contents rapidly became a greenish blue colour. This colour disappeared again after the voltage was switched off, with short-circuiting of the cell resulting in faster decoloration. The final state of the cell coloration was then pale yellow again, as at the beginning.

EXAMPLE 8

An experiment was carried out as described in Example 7 using polymer 2.6 instead of polymer 2.7. The colour change of the cell contents after application and switching off of a direct voltage of 0.9 V is analogous to Example 7.

EXAMPLE 9

An experiment was carried out as described in Example 7 using a solution of 2 polymers 3.3 and 4.2 (each 0.01 molar)

instead of a 0.02 molar solution of polymer 2.7. The colour change of the cell contents after application and switching off of a direct voltage of 0.9 V is analogous to Example 7.

EXAMPLE 10

An electrochromic display device was constructed.

An ITO-coated glass plate (resistance 12 Ω/) was sprayed on the coated side with a commercially available photoresist, for example ®Positiv 20 (Kontakt Chemie, Iffezheim), and dried in the dark for 1 hour at from 50 to 70° C. The resist layer was then covered with a film containing, as shown in FIG. 1, black segments in a transparent environment. This film was printed with a laser printer in accordance with a master produced on the computer. The photoresist layer was then exposed to UV light (from a mercury lamp, for example ®HBO 200W/2 (Osram) or from a ®XBO 75W/2 (Osram) xenon high-pressure lamp) for from 1 to 5 minutes. The film was removed, and the resist layer was treated in a sodium hydroxide solution bath (7 g of sodium hydroxide per litre of water) in such a way that the unexposed areas were rinsed off. The glass plate prepared in this way was then placed in a bath consisting of 67 g of $FeCl_2 \times 4\ H_2O$, 6 g of $SnCl_2 \times 2\ H, 2O$, 104 ml of water and 113 ml of 37% strength by weight hydrochloric acid, which caused the ITO layer to be detached in the resist-free, previously unexposed areas. The resist layer which remained was removed using acetone. A glass plate (1) carrying segments (4), conductor connections (3) and contacts (2) was obtained.

A rectangular ring was cut out of a polyethylene film with a thickness of 0.05 mm.

An approximately 1–2 cm long piece (5) was removed from its long sides. This film was then placed on the ITO-coated side of a second glass plate (7). A two-component adhesive, for example UHU® plus endfest 300 (UHU GmbH, Buhl) was applied outside the film—with the exception of the aperture (6). The etched glass plate (1) produced as described above was then laid on the film in such a way that the ITO layer lay on the side of the film (see FIG. 2). The two-component adhesive was then allowed to set, if necessary through gentle warming to about 40° C.

The cell was then filled, under a nitrogen atmosphere, with a solution of 572 mg of the polymeric electrochromic substance 2.4 in 10 ml of anhydrous propylene carbonate via the aperture (6), for example with the aid of a fine pipette or by drawing-ill the solution under reduced pressure. The fill aperture (6) was then filled with a fitting piece of polyethylene film and tightly sealed using a two-component adhesive.

By application of a voltage of 0.9 V to the contacts (2) of the segments (negative pole) and the unetched second plate (7) (positive pole), a deep grey-blue image of the contacted segments formed within 2 seconds. In this way, all letters and numbers which can be displayed by means of 7 segments were displayed in grey-blue on a pale-yellow background. By switching off the voltage and short-circuiting the contacts, the image disappeared again within a few seconds. The segments were imaged with sharp edges. Even after continuous operation for a number of hours in the vertical position of the display device, the segments were uniformly coloured and exhibited sharp edges.

More than 100,000 such switching cycles were survived without change. The grey-blue coloration exhibited absorption maxima at 453, 482, 565, 606 and 662 nm.

EXAMPLE 11

Example 5 was repeated, but 1.44 g of the UV absorber of the formula

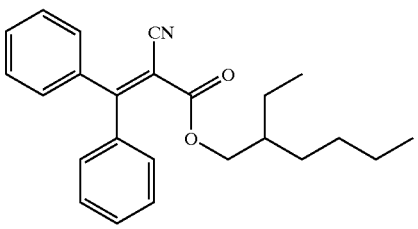

were added to the electrochromic solution. The behaviour of the display device during switching-on and switching-off of the current remained unchanged. While the cell of Example 5 had become a brown colour after only 14 days exposure in the switched-off state in the xenon tester, this cell remained coloured and completely unchanged in its function under identical conditions.

EXAMPLE 12

Example 10 was repeated, but 1.16 g of the UV absorber of the formula

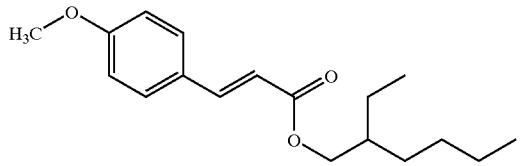

were added to the electrochromic solution. The behaviour of the display device during switching-on and switching-off of the current remained unchanged. While the cell of Example 10 had become a brown colour after only 14 days exposure in the switched-off state in the xenon tester, this cell remained coloured and complete the unchanged in its function under identical conditions.

EXAMPLE 13

An ITO-coated glass plate was etched as described in Example 6. A glass plate (1) carrying segments (4), conductor connections (3) and contacts (2) was obtained.

Figure 2:
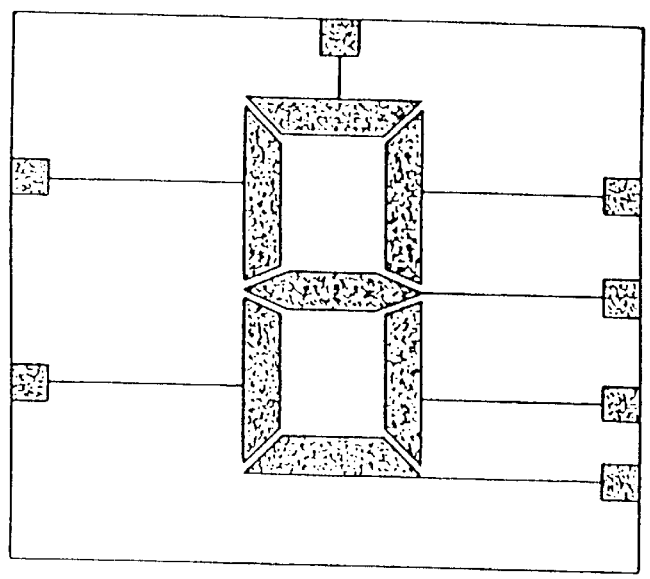
FIG. 2 is an glass plate with a film used to make an electrochromic device in accordance with the invention.

In a glove box, a second ITO-coated glass plate (7) was coated evenly on the ITO-coated side over about ¾ of the area with a 30% strength by weight solution of the electrochromic polymer used in Example 6 in dimethylformamide. The plate (1) was laid, likewise in the glove box, on this solution coating by means of each etched side in such a way that the two plates lay one on top of the other as shown in FIG. 2. The two plates were then manually pressed hard against one another and rubbed gently against one another so that any included air bubbles were able to escape. During this, some of the viscous solution was pressed out and was carefully wiped off with a tissue paper. The thickness of the solution layer between the two plates was then 30 μm. The four edges of the solution layer enclosed between the plates (1) and (7) were then sealed in the glove box using a ®Pattex Supermatic hot-adhesive gun (Henkel KGaA, Düsseldorf). The cured hot-adhesive seam was subsequently enclosed by an epoxy adhesive ®Körapox 735 (Kömmerling, Pirmasenz) and thus mechanically stabilized. The epoxy adhesive was cured overnight at room temperature.

In this way, a cell was obtained which was similar to that of Example 10, but with a smaller layer separation.

By application of a voltage of 1.2 V to the contacts (2) of the segments (negative pole) and the unetched second plate (7) (positive pole), a deep blue-grey image of the contacted segments was formed within one second. In this way, all letters and numbers which can be displayed by means of 7 segments were displayed in grey-blue on a pale-yellow background. By switching off the voltage and short-circuiting the contacts, the image disappeared again within a 1 second. The segments were imaged with sharp edges. Even after continuous operation for a number of hours in the vertical position of the display device, the segments were uniformly coloured and exhibited sharp edges.

More than 10,000 such switching cycles were survived without change. The grey-blue coloration exhibited absorption maxima at 453, 482, 565, 606 and 662 nm.

EXAMPLE 14

In a glove box, two ITO-coated plates (resistance 12 Ω/) in the 5×5 cm² format were coated evenly on the ITO side over about ¾ of the area with a 0.075 molar solution of the electrochromic polymer used in Example 6 in dimethylformamide, and were stored precisely horizontally. Over the course of 4–5 hours, all the solvent evaporated into the nitrogen atmosphere, and a pale-yellow, transparent coating of the electrochromic polymer was obtained on the plates. 5 drops of a 25% strength by weight lithium perchlorate solution in acetonitrile were then applied to one of these coatings in the glove box. The second plate was placed on this solution by means of its coated side in such a way that the polymer-coated surfaces were located one above the other an(d the uncoated surfaces were uncovered on each side. The plates were then pressed together, and the solution emerging was wiped off using a tissue cloth. The separation between the two ITO-coated glass plates was then 10 Em. As described in Example 13, the device was then sealed at the four edges using hot-melt adhesive and protected using epoxy adhesive.

An electrochromic device was obtained in this way. By application of a voltage of 1.5 V to the two outside, uncoated surfaces of the two plates, an intense blue-grey coloration was obtained over the entire area within 1–2 seconds. This disappeared completely again within 1–2 seconds after the voltage had been switched off and the cell had been short-circuited.

Figure 3:
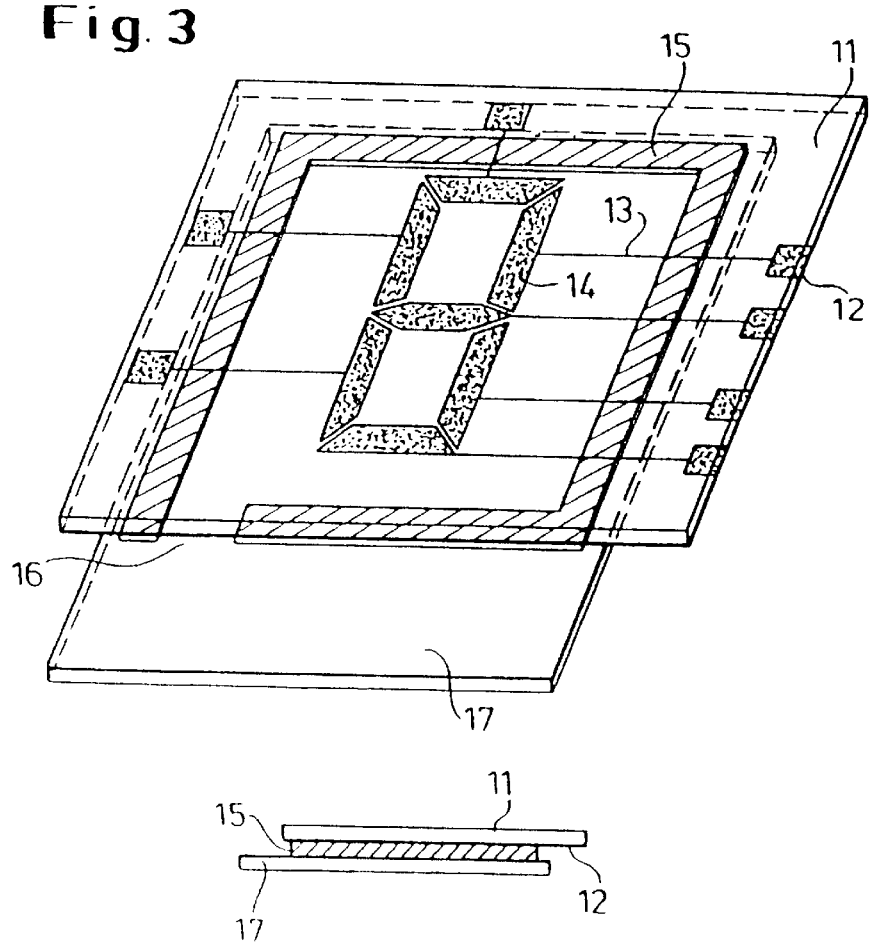
FIG. 3 is an electrochromic device, made in accordance with the invention.

FIG. 3 is an electrochromic device, made in accordance with the invention, in which the plate 11 and the plate 17 are attached to the solution layer 17. A polymer coated surface 14 and a contact 12 are electrically connected to the polymer surface 14 via conductor 13. Element 15 is sealing ring and element 16 is an opening.

What is claimed is:

1. A process for preparing the polymer according to a polymer of the Formula I dissolved in at least one polar solvent

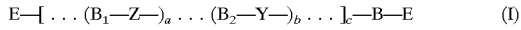

wherein the units —$B_1$—Z— and —$B_2$—Y— are linked to one another alternately, randomly or in blocks, Y and Z, independently of one another, are a radical $RED_1$ or $OX^2$, wherein $OX_2$ is a reversibly electrochemically reducible substituent which is converted into $RED_2$ by electron take-up at a cathode, wherein an increase in the absorbance in the visible region of the spectrum from a colorless or weakly colored form into a colored form is associated with the electron take-up, and wherein in each case the colorless or weakly colored form is re-formed after charge equalization, $RED_1$ is a reversibly electrochemically oxidizable substituent which is converted into $OX_1$ by electron release at an anode, wherein an increase in the absorbance in the visible region of the spectrum from a colorless or weakly colored form into a colored form is associated with the electron release, and wherein the colorless or weakly colored form is reformed after charge equalization, and B is $B_1$ or $B_2$, $B_1$ and $B_2$ are identical or different bridging units, E is an end group of the polymer chain, a and b are the molar fractions of the monomer units —$B_1$—Z— and —$B_2$—Y—, which have any desired values between 0 and 1, wherein a=1−b, c is a number-average degree of polymerization $c_n$ and is from 3 to 200,000, wherein the ratio between $c_n$ and the weight-average degree of polymerization $c_w$ (polymolarity index) $Q=c_w/c_n$ is between 1.1 and 100, the process comprising (A) subjecting one or more $RED_1$- and/or $OX_2$- containing monomers of formulae selected from the group consisting of XXVI, XXVII and XXVIII to a polymerization, polycondensation or polyaddition reaction or a polymer-analogous reaction:

(XXVI),

(XXVII),

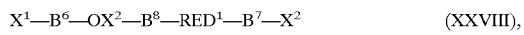

(XXVIII), wherein $OX^2$ is the radical of a reversibly electrochemically reducible redox system, $RED^1$ is the radical of a reversibly electrochemically oxidizable redox system, $B^6$, $B^7$ and $B^8$ are the bridging units, and $X^1$ and $X^2$ are each a group which is capable of polymerization, poly-condensation or polyaddition or a group which is capable of polymer-analogous reaction, and (B) dissolving the resulting polymer in at least one dipolar aprotic solvent.

2. The process according to claim 1, wherein, in the monomers of the formulae XXVI, XXVII and XXVIII, $OX^2$ is a radical has a formula selected from the formulae consisting of IX, X, XI, XII, XIII, XIV, XV, XVI, XVII, and XVIII:

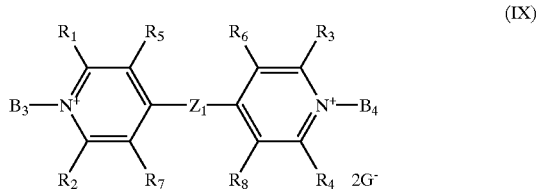

(IX)

-continued

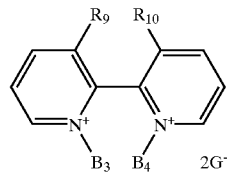
(X)

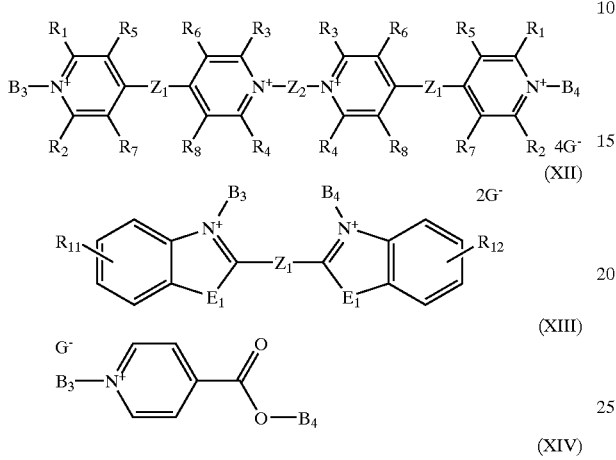
(XI)
(XII)
(XIII)
(XIV)
(XV)
(XVI)
(XVII)

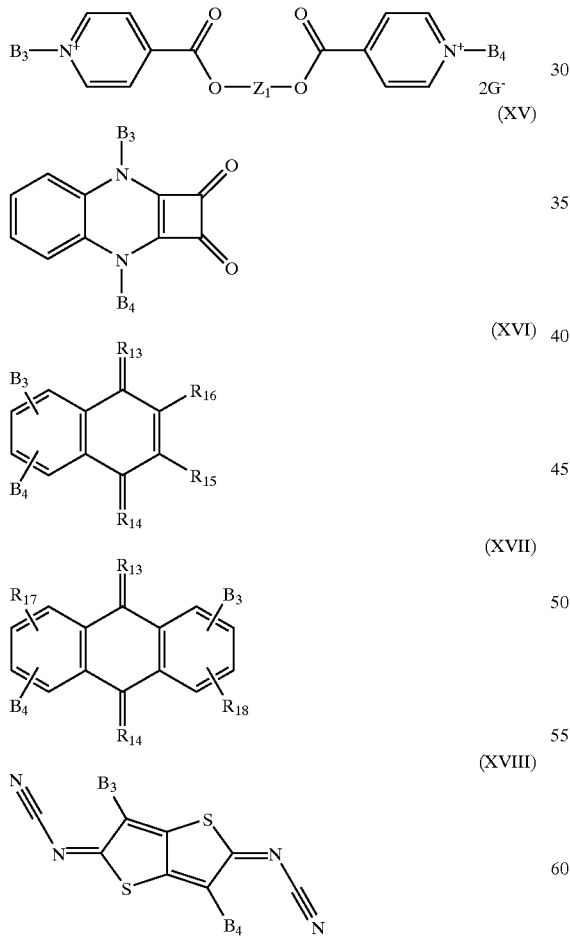
(XVIII)

wherein $R_1$ to $R_4$, independently of one another, are hydrogen, $(C_1–C_8)$-alkyl, $(C_2–C_{12})$-alkenyl, $(C_3–C_7)$-cycloalkyl, $(C_7–C_{15})$-aralkyl or $(C_6–C_{10})$-aryl, $R_5$ and $R_6$ or $R_7$ and $R_8$ are hydrogen or together are a —$(CH_2)_2$— or —$(CH_2)_3$— bridge, $R_9$ and $R_{10}$, independently of one another, are hydrogen or in pairs are a —$(CH_2)_2$—, —$(CH_2)_3$— or —CH=CH— bridge, $R_{11}$, $R_{12}$, $R_{17}$ and $R_{18}$, independently of one another, are hydrogen, $(C_1–C_4)$alkyl, $(C_1–C_4)$-alkoxy, halogen, cyano, nitro or $(C_1–C_4)$-alkoxycarbonyl, $R_{13}$ and $R_{14}$, independently of one another, are O, N—CN, $C(CN)_2$ or N-$(C_6–C_{10})$aryl-, $R_{15}$ and $R_{16}$ are a —CH=CH—CH=CH— bridge, $E_1$ is an O or S atom, $Z_1$ is a direct bond, —CH=CH—, —C(CH_3)=CH—, —C(CN)=CH—, —CCl=CCl—, —C(OH)=CH—, —CCl=CH—, —CH=CH—, —CH=N—N=CH—, —C(CH_3)=N—N=C(CH_3)— or —CCl=N—N=CCl—, $Z_2$ is —$(CH_2)_r$—, p- or m-$CH_2$—$C_6H_4$—$CH_2$—, r is an integer form 1 to 10, and $G^-$ is a colorless anion which is redox-inert under the conditions, and $RED^1$ is a radical selected from the group consisting of compounds having the formulae XIX, XX, XXI, XXII, XXIII, XIV and XXV:

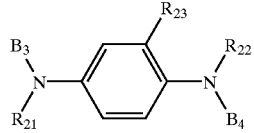
(XIX)

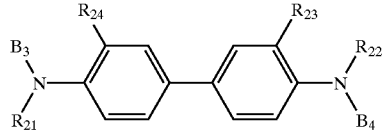
(XX)

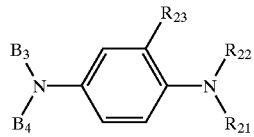
(XXI)

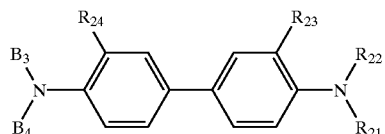
(XXII)

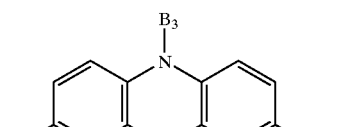
(XXIII)

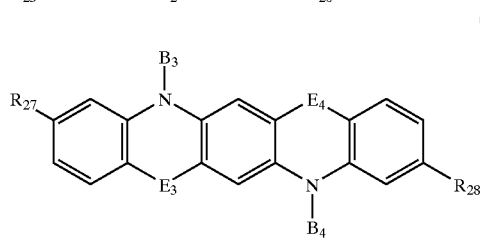
(XXIV)

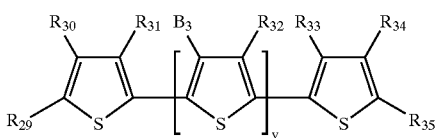

(XXV)

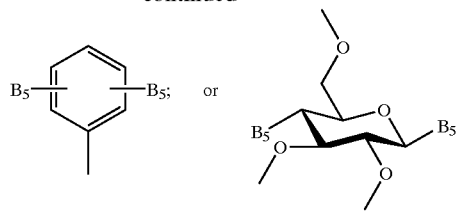

wherein $R_{21}$ and $R_{22}$ are $(C_1-C_8)$-alkyl, $(C_2-C_{12})$-alkenyl, $(C_3-C_7)$-cycloalkyl, $(C_7-C_{15})$-aralkyl or $(C_6-C_{10})$-aryl, $R_{23}$ to $R_{28}$, independently of one another, are hydrogen, $(C_1-C_4)$-alkyl, $(C_1-C_4)$-alkoxy, halogen, cyano, nitro, $(C_1-C_4)$-alkoxycarbonyl or $(C_6-C_{10})$-aryl, and $R_{26}$ is additionally $NR^{37}R_{37}$, $R_{29}$ to $R_{35}$, independently of one another, are hydrogen, $(C_1-C_4)$-alkyl, $(C_1-C_4)$-alkoxy, cyano, $(C_1-C_4)$-alkoxycarbonyl or $(C_6-C_{10})$-aryl, or $R_{29}$ and $R_{30}$, and $R_{34}$ and $R_{35}$, independently of one another, together are a —$(CH_2)_3$—, —$(CH_2)_4$— or —CH=CH—CH=CH— bridge, $E_2$ is an O or S atom or the groups N—$B_4$, $C(CH_3)_2$, C=O or $SO_2$, $E_3$ and $E_4$ is an O or S atom or the group $NR^{36}$, $R^{36}$ and $R^{37}$, independently of one another, are $(C_1-C_{12})$-alkyl, $(C_2-C_8)$ alkenyl, $(C_3-C_7)$ cycloalkyl, $(C_7-C_{15})$-aralkyl or $(C_6-C_{10})$-aryl, and $R^{36}$ is additionally hydrogen, $R^{37}$ in the meaning of $NR^{37}R^{37}$ together with the N atom to which they are bonded, form a five or six-membered, saturated ring, which may contain further heteroatoms, v is an integer from 1 to 20, if $B_3$ is identical to $B_4$, $B_3$ and $B_4$ are identical to $B_1$ or $B_2$, if $B_3$ is not identical to $B_4$ or $B_4$ is absent, $B_3$ is —$[Y^1{}_s$—$(CH_2)_m$—$Y^2$—$(CH_2)_e$—$Y^3]_o$—$Y^4$, wherein $Y^1$ is O, $NR^{19}$, COO, OCO, CONH, OCONH, NHCONH, C(=O), OC(=O)O, —$CH_2$—CH=CH— (trans- or cis-), —$CH_2$—C=C—, $(C_4-C_7)$-cycloalkanediyl, $(C_6-C_{12})$-arylene or $(C_7-C_{14})$-arylalkylene, $Y^2$ is O, $NR^{19}$, COO, OCO, CONH, —CH=CH— (trans- or cis-), —C=C—, $(C_4-C_7)$-cycloalkanediyl or $(C_6-C_{12})$-arylene, $Y^3$ is O, $NR^{19}$, COO, OCO, CONH or $(C_6-C_{12})$-arylene, and $Y^4$ is

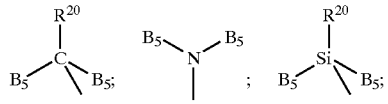

or

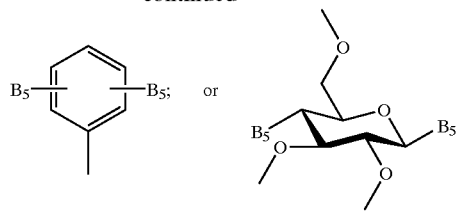

wherein $B_5$ is $B_1$ or $B_2$, and $R_{20}$ is hydrogen, $(C_1-C_{18})$-alkyl, $(C_1-C_4)$-alkoxy, $(C_1-C_4)$-alkoxycarbonyl, $(C_6-C_{10})$-aryl, halogen or cyano, $B_4$ is absent or is hydrogen, $(C_1-C_{18})$-alkyl, $(C_2-C_{12})$-alkenyl, $(C_1-C_4)$-alkoxy, $(C_3-C_7)$-cycloalkyl, $(C_1-C_4)$-alkoxycarbonyl, $(C_7-C_{15})$-aralkyl, $(C_6-C_{10})$-aryl, halogen, cyano or nitro, and $B_1$ and $B_2$ are identical or bridging units, or wherein $B^3$ and $B^4$ are replaced by the bridging units $B^6$, $B^7$ and $B^8$, $X^1$ and $X^2$ are halogen, —OH, —O⁻, —COOH, —COO—$(C_1-C_4)$-alkyl, —O(=O)—$(C_1-C_4)$-alkyl, —COO⁻, —$NH_2$, —NH—$(C_1-C_4)$-alkyl, —N=C=O, or a tertiary nitrogen atom which carries three identical or different $(C_1-C_{12})$-alkyl, $(C_7-C_{15})$-aralkyl or $(C_6-C_{10})$-aryl substituents or is a member of a 4- to 7-atom ring, which may also contain further heteroatoms, or $X^1$ or $X^2$ is a C=C— double bond, an —O—C(=O)—CH=$CH_2$ group or an —O—C(=O)—$C(CH_3)$=$CH_2$— group.

3. The process according to claim 1, wherein the electrochromic monomers of formulae XXVI to XXVIII, in which $X^1$ and $X^2$ are primary or secondary OH groups, are polycondensed with aliphatic or aromatic diisocyanates.

4. The process according to claim 1, wherein the electrochromic monomers of formulae XXVI to XXVIII, in which $X^1$ and $X^2$ are primary halogen groups, are subjected to a polyaddition reaction with aliphatic or aromatic compounds which have two tertiary nitrogen atoms which themselves carry three identical or different $(C_1-C_{12})$-alkyl, $(C_7-C_{15})$-aralkyl, or $(C_6-C_{10})$-aryl substituents or are members of the 4- to 7-atom ring.

5. The process according to claim 1, wherein the electrochromic monomers of formulae XXVI to XXVIII, in which $X^1$ and $X^2$ or both, is or are, at least one C=C double bond, are polymerized by free-radical polymerization.

6. The process according to claim 1, wherein the electrochromic monomers of formulae XXVI to XXVIII, in which $X^1$ and $X^2$ are two OH groups, are polycondensed with dicarboxylic acid dichlorides.

* * * * *